United States Patent
Moeller et al.

(10) Patent No.: US 10,569,890 B2
(45) Date of Patent: Feb. 25, 2020

(54) AIRBAG ASSEMBLY FOR LEG FLAIL PROTECTION AND ASSOCIATED SYSTEMS AND METHODS

(71) Applicant: AmSafe, Inc., Phoenix, AZ (US)

(72) Inventors: Trenton Dirk Moeller, Mesa, AZ (US); Giuseppe Gullotto, Mesa, AZ (US)

(73) Assignee: AmSafe, Inc., Phoenix, AZ (US)

( * ) Notice: Subject to any disclaimer, the term of this patent is extended or adjusted under 35 U.S.C. 154(b) by 991 days.

(21) Appl. No.: 14/808,983

(22) Filed: Jul. 24, 2015

(65) Prior Publication Data

US 2016/0052636 A1   Feb. 25, 2016

Related U.S. Application Data

(60) Provisional application No. 62/041,549, filed on Aug. 25, 2014.

(51) Int. Cl.
*B64D 25/02* (2006.01)
*B60R 21/207* (2006.01)
(Continued)

(52) U.S. Cl.
CPC ............ *B64D 25/02* (2013.01); *B60R 21/207* (2013.01); *B60R 2021/0053* (2013.01);
(Continued)

(58) Field of Classification Search
CPC ................ B64D 25/02; B64D 2201/00; B64D 11/06205; B60R 2021/0053; B60R 2021/0093; B60R 21/207
(Continued)

(56) References Cited

U.S. PATENT DOCUMENTS 2,859,803 A * 11/1958 McCallister ............. B64D 1/00
   244/122 R
5,161,821 A   11/1992 Curtis
(Continued)

FOREIGN PATENT DOCUMENTS

EP   0688702 B1   9/1999
EP   2734445 B1   8/2016
(Continued)

OTHER PUBLICATIONS

United States International Searching Authority; International Search Report and Written Opinion; PCT Application No. PCT/US15/046581; Applicant: Amsafe Inc.; dated Nov. 30, 2015; 9 pages.

*Primary Examiner* — Richard R. Green
*Assistant Examiner* — Brady W Frazier
(74) *Attorney, Agent, or Firm* — Perkins Coie LLP

(57) ABSTRACT

An airbag assembly for leg flail protection and associated systems and methods are described herein. An airbag system configured in accordance with an embodiment of the present technology can include, for example, a housing having a cavity and an opening in communication with the cavity, an airbag stowed within the cavity, and an inflator operably coupled to the airbag. The airbag can be configured to deploy through the opening of the housing during a crash or other significant dynamic event. The airbag can deploy outwardly from the side-facing seat to reduce occupant leg rotation during the crash or other significant dynamic event. The airbag can be pushed out of the housing before it is fully inflated. The airbag can be stowed and include folded first and second opposing side portions such that when the airbag is deployed, the portion nearest the occupant unfurls toward the occupant prior to the other portion farthest from the occupant unfurling in a direction away from the occupant.

15 Claims, 32 Drawing Sheets

(51) Int. Cl.
  *B60R 21/00* (2006.01)
  *B64D 11/06* (2006.01)
(52) U.S. Cl.
  CPC . *B60R 2021/0093* (2013.01); *B64D 11/06205* (2014.12); *B64D 2201/00* (2013.01)
(58) Field of Classification Search
  USPC .... 244/100 A, 121; 280/728.1, 728.2, 730.1, 280/736, 743.1
  See application file for complete search history.

(56) References Cited

U.S. PATENT DOCUMENTS

| | | | |
|---|---|---|---|
| 5,492,361 A | 2/1996 | Kim | |
| 5,496,059 A | 3/1996 | Bauer | |
| 5,853,191 A | 12/1998 | Lachat | |
| 5,911,434 A | 6/1999 | Townsend | |
| 6,029,993 A * | 2/2000 | Mueller | B60R 21/23138 280/730.2 |
| 6,065,772 A | 5/2000 | Yamamoto et al. | |
| 6,142,508 A | 11/2000 | Lewis | |
| 6,155,598 A | 12/2000 | Kutchey | |
| 6,206,411 B1 | 3/2001 | Sunabashiri | |
| 6,217,059 B1 | 4/2001 | Brown et al. | |
| 6,237,936 B1 * | 5/2001 | Quade | B60R 21/207 280/728.2 |
| 6,254,130 B1 | 7/2001 | Jayaraman et al. | |
| 6,425,601 B1 | 7/2002 | Lewis | |
| 6,874,812 B2 | 4/2005 | Keutz et al. | |
| 6,966,576 B1 | 11/2005 | Greenstein | |
| 7,278,656 B1 | 10/2007 | Kalandek | |
| 7,431,332 B2 | 10/2008 | Wipasuramonton et al. | |
| 7,557,052 B2 | 7/2009 | Konishi et al. | |
| 8,727,061 B2 | 5/2014 | Rydsmo et al. | |
| 8,851,511 B1 | 10/2014 | Volkmann et al. | |
| 8,894,095 B1 | 11/2014 | Meister et al. | |
| 8,939,465 B2 | 1/2015 | Kastelic et al. | |
| 8,955,914 B2 | 2/2015 | Meister et al. | |
| 9,067,681 B2 | 6/2015 | Cailleteau | |
| 9,139,114 B2 | 9/2015 | Meister et al. | |
| 9,296,317 B2 | 3/2016 | Meister et al. | |
| 9,315,271 B2 | 4/2016 | Oleson et al. | |
| 9,511,866 B2 * | 12/2016 | Gehret | B64D 11/062 |
| 9,821,913 B1 | 11/2017 | Deevey et al. | |
| 2002/0167207 A1 | 11/2002 | Larson | |
| 2004/0021304 A1 * | 2/2004 | Tanase | B60R 21/207 280/729 |
| 2004/0147186 A1 * | 7/2004 | Konishi | B60R 21/26 442/76 |
| 2005/0127654 A1 * | 6/2005 | Johansson | B60N 2/005 280/749 |
| 2005/0218635 A1 | 10/2005 | Wipasuramonton et al. | |
| 2007/0046082 A1 * | 3/2007 | Yoshikawa | B60N 2/42718 297/216.1 |
| 2008/0088118 A1 | 4/2008 | Wipasuramonton et al. | |
| 2009/0284066 A1 * | 11/2009 | Higuchi | B60N 2/4221 297/468 |
| 2010/0194083 A1 * | 8/2010 | Sugimoto | B60R 21/207 280/730.2 |
| 2001/0285115 | 11/2011 | Putala et al. | |
| 2011/0278826 A1 * | 11/2011 | Fukawatase | B60R 21/231 280/730.2 |
| 2013/0106080 A1 | 5/2013 | Jarboe et al. | |
| 2013/0241180 A1 | 9/2013 | Gehret et al. | |
| 2014/0159356 A1 * | 6/2014 | Kastelic | B64D 11/06 280/730.2 |
| 2014/0353951 A1 * | 12/2014 | Meister | B60R 21/23138 280/730.1 |
| 2017/0028960 A1 | 2/2017 | Kobayashi et al. | |

FOREIGN PATENT DOCUMENTS

| | | |
|---|---|---|
| EP | 3165459 A1 | 5/2017 |
| WO | 2013012890 A1 | 1/2013 |
| WO | 2015061336 A2 | 4/2015 |
| WO | 2016032971 A1 | 3/2016 |
| WO | 2016041783 A1 | 3/2016 |
| WO | 2016137932 A1 | 9/2016 |
| WO | 2017008015 A1 | 1/2017 |
| WO | 2017173397 A1 | 10/2017 |

* cited by examiner

AIRBAG ASSEMBLY FOR LEG FLAIL PROTECTION AND ASSOCIATED SYSTEMS AND METHODS

CROSS-REFERENCE TO RELATED APPLICATION(S)

The present application claims priority to and the benefit of U.S. Provisional Application No. 62/041,549, filed Aug. 25, 2014 and titled AIRBAG ASSEMBLY FOR LEG FLAIL PROTECTION AND ASSOCIATED SYSTEMS AND METHOD, which is incorporated herein by reference in its entirety.

TECHNICAL FIELD

The present technology relates generally to vehicle safety systems, and more specifically, to airbag assemblies for leg flail protection in aircraft and other vehicles and associated systems and methods.

BACKGROUND

Various types of seat belt and airbag systems have been used to protect passengers in automobiles, aircraft, and other vehicles. In automobiles, for example, airbags typically deploy from the steering column, dashboard, side panel, and/or other fixed locations. In a typical airbag system, a sensor detects a rapid deceleration event (e.g., a collision or crash), and transmits a corresponding signal to an initiation device (e.g., a pyrotechnic device) on an airbag inflator. This causes the inflator to release compressed gas into the airbag, thereby rapidly inflating and deploying the airbag.

Although airbags that deploy from stationary locations (e.g., a steering column) may be effective in automobiles, they may not be as effective in other types of vehicles (e.g., aircraft) having other seating arrangements. As a result, airbags have been developed that deploy from seat belts to accommodate occupants in aircraft and other vehicles.

Certain types of passenger aircraft (e.g., private, commercial, or military jets), for example, can be configured with side-facing seats, divans, or rows of seating. A recent policy statement governing safety requirements for side-facing seats from the Federal Aviation Administration (FAA) includes a requirement that "[a]xial rotation of the upper-leg (femur) must be limited to 35 degrees in either direction from the nominal seated position." See FAA policy statement PS-ANM-25-03, *Technical Criteria for Approving Side-Facing Seats*, dated Jun. 8, 2012. Certain manual devices requiring actuation by a seat occupant or flight attendant prior to take-off have been developed to prevent rotation of the leg ("leg flail") in this context. However, manual devices require user actuation and may not always be activated for use, especially during situations without flight attendant oversight. Further, these devices may not be able to prevent leg flail for a full range of occupant sizes that may occupy a seat. Additionally, FAA regulations require that such devices automatically retract post-crash, requiring the retraction mechanism be resistant to crash damage. Some embodiments of airbag systems described herein can address these requirements.

DETAILED DESCRIPTION

Figure 1:
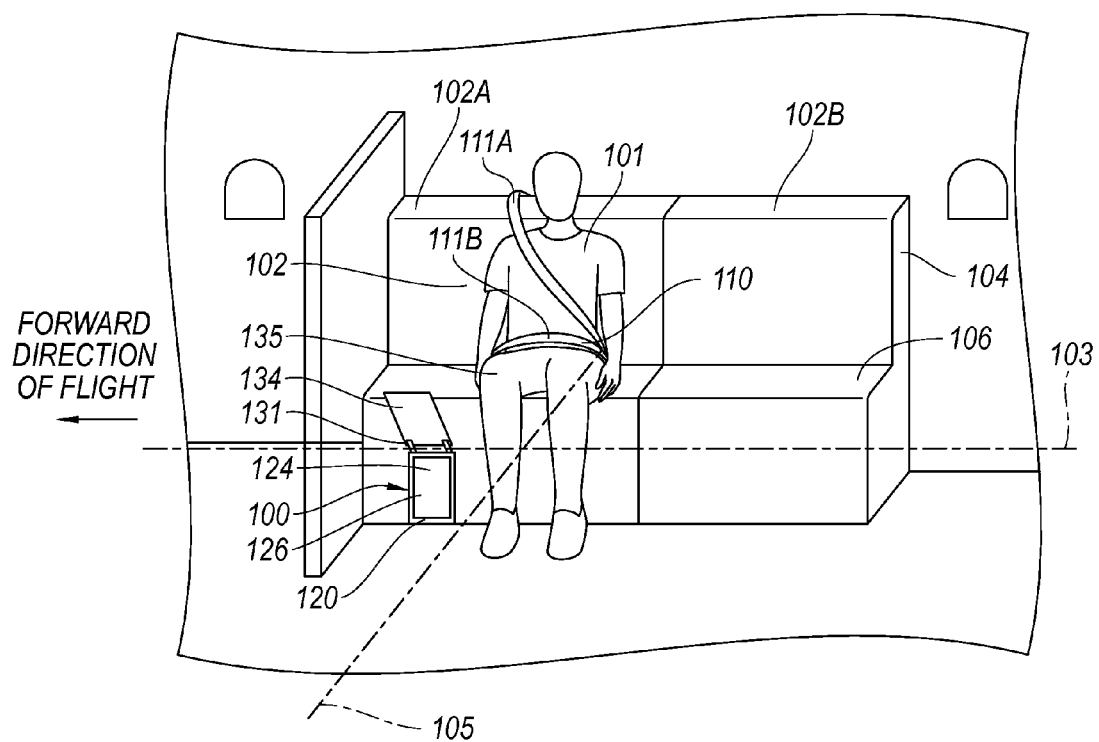
FIG. 1 is a front isometric view of a seating area in a vehicle having a side-facing seat provided with a structure mounted airbag system configured in accordance with an embodiment of the present technology.

The present technology describes various embodiments of airbag assemblies and associated systems and methods for providing leg flail protection in aircraft and other vehicles. In several embodiments, for example, an airbag system in a private jet or other aircraft can include a housing or module positioned or installed forward of and at (or below) a seat portion of a side-facing seat, divan, or row of side-facing seats, and/or in front of a leading leg of a side-facing seated occupant. An airbag can be deployed in response to a signal from a crash sensor, eliminating the need for occupant or flight attendant actuation prior to take-off. In some embodiments, the airbag is designed to deflate and/or retract (e.g., automatically) within seconds after deployment in order to not impede passenger egress off the aircraft after the crash or other significant dynamic event. The airbag is positioned to avoid injuring the occupant during deployment. Additionally, the airbag can be sized to prevent leg flail for a full size range of occupants that may be seated in the aircraft. Further, in some embodiments, the airbag can be concealed within the seat or a surrounding or adjacent structure (e.g., a monument) to improve the cosmetics and aesthetics of the aircraft cabin. During deployment, the airbag can use a front and/or side portion of the seat and/or adjacent structure as a reaction surface. After deployment, the airbag can be deflated and retracted back toward the housing to facilitate occupant egress.

Certain details are set forth in the following description and in FIGS. 1-13E to provide a thorough understanding of various embodiments of the present technology. For example, several embodiments of airbag systems are described below in the context of business and commercial jets with side-facing seats. However, the airbag systems and aspects thereof disclosed herein may be used in a wide variety of other vehicles, including other aircraft (e.g., private, commercial, and military airplanes and helicopters), ground vehicles (e.g., civilian and military automobiles, trucks, buses, trains, and motor homes), watercraft, etc. Other details describing well-known structures and systems often associated with airbags, occupant restraint systems, airbag initiation circuitry, etc., however, are not set forth below to avoid unnecessarily obscuring the description of the various embodiments of the present technology.

Many of the details, dimensions, angles and other features shown in FIGS. 1-13E are merely illustrative of particular embodiments of the present technology. Accordingly, other embodiments can include other details, dimensions, angles and features without departing from the spirit or scope of the present invention. In addition, those of ordinary skill in the art will appreciate that further embodiments of airbag systems described herein can be practiced without several of the details described below. Various embodiments of the present technology can also include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the discussion of any particular element, the most significant digit or digits of any reference number refers to the Figure in which that element is first introduced. For example, element 110 is first introduced and discussed with reference to FIG. 1.

FIG. 1, for example, is a front isometric view of a seating area in an aircraft having a side-facing seat 102 (e.g., a divan, bench, etc.) having two seat positions (e.g., identified individually as a first side facing seat 102A and a second side-facing seat 102B) provided with a structure mounted airbag system 100 ("airbag system 100") configured in accordance with an embodiment of the present technology. While only one airbag system 100 is illustrated, the side-facing seat 102B can also be provided with its own airbag system 100. In other embodiments, additional seat positions and/or airbag systems can also be provided with the side-facing seat 102 described herein. As used herein, the terms "structure mounted" and "structure mountable" generally refer to features (e.g., airbag systems) that are or can be mounted to a substantially fixed structure (e.g., a wall, divider, piece of furniture, or other interior aircraft structure or monument) rather than to a movable structure or member (e.g., a seat belt, etc.). In the illustrated embodiment, the side-facing seat 102 faces transverse to the direction of aircraft travel. Accordingly, the side-facing seat 102 is positioned transversely to a longitudinal axis 103 of the aircraft oriented along the direction of travel.

In one aspect of the illustrated embodiment, the side-facing seat 102 can be generally similar to conventional side-facing seats or divans in, for example, a business aircraft or jet. Accordingly, each of the seats 102A and 102B can include a back portion 104 extending upwardly from a seat portion 106 (e.g., a cushion) fixedly mounted to the floor of the aircraft. The seats 102 can include an occupant restraint or seat belt 110 (e.g., a two-point restraint, three-point restraint, etc.) configured to prevent harmful movement of a seat occupant 101 during a crash or other significant dynamic event. The seat belt 110 can include a shoulder belt portion 111A and a lap belt portion 111B for restraining the occupant 101. In certain embodiments, the seat belt 110 (e.g., the shoulder belt portion, lap belt portion, etc.) can include an airbag unit or system as described in greater detail below. For example, suitable seat belt airbag systems and features are described in U.S. Pat. No. 5,984,350, titled VEHICLE SAFETY SYSTEM, U.S. Pat. No. 6,439,600, titled SELF-CENTERING AIRBAG AND METHOD FOR MANUFACTURING AND TUNING THE SAME, U.S. Pat. No. 6,505,854, titled VEHICLE RESTRAINT SYSTEM, U.S. Pat. No. 7,665,761, titled INFLATABLE PERSONAL RESTRAINT SYSTEMS AND ASSOCIATED METHODS OF USE AND MANUFACTURE, U.S. Pat. No. 6,957,828, titled INFLATABLE LAP BELT SAFETY BAG, U.S. Pat. No. 7,980,590, titled INFLATABLE PERSONAL RESTRAINT SYSTEMS HAVING WEB-MOUNTED INFLATORS AND ASSOCIATED METHODS OF USE AND MANUFACTURE, U.S. Pat. No. 8,469,397, titled STITCH PATTERNS FOR RESTRAINT-MOUNTED AIRBAGS AND ASSOCIATED SYSTEMS AND METHODS, U.S. Pat. No. 8,439,398, titled INFLATOR CONNECTORS FOR INFLATABLE PERSONAL RESTRAINTS AND ASSOCIATED SYSTEMS AND METHODS, U.S. Pat. No. 8,556,293, titled BUCKLE CONNECTORS FOR INFLATABLE PERSONAL RESTRAINTS AND ASSOCIATED METHODS OF USE AND MANUFACTURE, U.S. Pat. No. 8,403,361, titled ACTIVATION SYSTEMS FOR INFLATABLE PERSONAL RESTRAINT SYSTEMS, U.S. Patent Application Pub. No. 2012/0259484, titled ACTIVATION SYSTEMS FOR INFLATABLE PERSONAL RESTRAINT SYSTEMS, U.S. Pat. No. 8,818,759, titled COMPUTER SYSTEM FOR REMOTE TESTING OF INFLATABLE PERSONAL RESTRAINT SYSTEMS, U.S. patent application Ser. No. 14/468,170, titled COMPUTER SYSTEM FOR REMOTE TESTING OF INFLATABLE PERSONAL RESTRAINT SYSTEMS, U.S. Patent App. Pub. No. 2013/0187646, titled ELECTRONIC MODULE ASSEMBLY FOR INFLATABLE PERSONAL RESTRAINT SYSTEMS AND ASSOCIATED METHODS, U.S. Patent App. Pub. No. 2012/0259484, titled INFLATABLE PERSONAL RESTRAINT SYSTEMS, and U.S. Provisional Application No. 62/139,684, titled EXTENDING PASS-THROUGH AIRBAG OCCUPANT RESTRAINT SYSTEMS, AND ASSOCIATED SYSTEMS AND METHODS. All of the foregoing patent references are incorporated herein by reference in their entireties.

In one aspect of the illustrated embodiment, the airbag system 100 includes a housing 120 (e.g., an enclosure or case) fixedly attached directly or indirectly to the floor of the aircraft or other substantially fixed structure (e.g., a seat base, armrest, storage compartment, monument, etc.) forward of a seated occupant's legs and generally below or adjacent the seat portion 106. As used herein, the term "forward of" refers to a position or location relative to the longitudinal axis 103. Therefore, "forward of" a particular location or object refers to a position closer to the front, nose, cockpit, and/or forward direction of flight of the aircraft than the particular location or object. Accordingly, as illustrated in FIG. 1, the housing 120 is located to the right of the seated occupant's legs 135. Therefore, in FIG. 1, a right side of the seated occupant 101 is "forward of" the left side of the seated occupant 101. In other embodiments, an airbag system 100 can be positioned on the left side of the occupant 101 or both sides of the occupant 101 when the occupant 101 is seated in the side-facing seat.

The housing 120 can be a separate or independent structural assembly positioned on the floor and at least partially concealed within a substantially fixed structure or monument within the aircraft interior. Concealing the housing 120 in this manner can inhibit passengers from accessing the airbag and/or associated components within the housing 120 and reduce or prevent the likelihood of inadvertent airbag deployment. In certain embodiments, the housing 120 can function as a partial divider between individual aircraft seats of a side-facing seat (e.g., between the first side-facing seat 102A and second side-facing seat 102B), an armrest, and/or a table for seat occupants. In some embodiments, an interior of the housing 120 can also be used as storage for other items such as the seat occupant's belongings, additional safety equipment (e.g., life vests), etc. In other embodiments, the housing 120 can be attached to or integrally formed with a fixed structure or monument within the aircraft interior. The housing 120 can be made from durable materials, such as composites, alloys (e.g., aluminum), and/or other suitable materials (e.g., steel) for storing the components of the airbag system 100, reducing the likelihood of inadvertent airbag deployment (e.g., due to passenger wear and tear on the housing 120), and/or reducing weight and size of the housing 120. In other embodiments, a separate housing 120 can be omitted. In such embodiments, a portion of the seat 102 (e.g., front, bottom, etc.) or other interior structure or monument can include an opening (e.g., cavity, recess, etc.) that an airbag (not shown) can be stored in, secured to, and/or deploy from. Any of the fasteners, lanyards, doors, tethers, hoses, fabric tubes, apertures, and other components described in more detail below with respect to the housing 120 can be used with or to secure or tether the airbag (not shown) to a portion of the seat 102 (e.g., front, bottom, etc.) or other interior structure or monument in place of the housing 120.

In the illustrated embodiment, the housing 120 is positioned within the seat 102 and includes a door 134 (e.g., cover) as described in more detail below that can be substantially aligned (e.g., flush or coplanar) with a front end portion of the seat 102. In other embodiments, the housing 120 can be positioned such that the door 134 is positioned substantially behind or in front of the front end portion of the seat 102. The housing 120 can include a plurality of assembled plates (not shown in FIG. 1) as described in greater detail below with reference to FIGS. 2A-2C and 6A-6C. The assembled plates can be arranged to define a cavity 124 within the housing 120. An airbag (not shown in FIG. 1) can be folded and stowed within the cavity 124. The cavity 124 further includes an opening 126 through which the airbag (not shown) can deploy outwardly during a crash or other significant dynamic event.

Although the door 134 is shown in an open position for sake of illustration in FIG. 1, the door 134 can be positioned across the opening 126 of the housing 120 to at least substantially conceal the cavity 124 prior to airbag deployment. In the closed position, for example, the door 134 can at least partially hide or conceal the airbag from view of the occupant(s) to provide a more aesthetically pleasing seating environment and also inhibit occupant(s) from accessing the airbag and/or associated components within the housing 120. The door 134 can be attached to the housing 120 via one or more suitable fasteners and/or hinges that enable the door 134 to swing or otherwise move away from the opening 126 under the force of the inflating airbag, thereby allowing the airbag to deploy through the opening 126. The door 134, for example, can be secured over the opening 126 with a plurality of frangible, releasable, or temporary fasteners (e.g., screws that are configured to break or release under the force of airbag deployment). In other embodiments, the door 134 can automatically move (e.g., rotate) away from the opening 126 in response to a significant dynamic event. The door 134, for example, can include electronic components (e.g., a sensor, an actuator, a controller, a power source, etc.) configured to automatically slide, rotate, and/or otherwise move the door 134 away from the opening 126 when a significant dynamic event is sensed. While illustrated as moving upward, in other embodiments, the door 134 can be secured to other portions of the housing 120 such that it rotates or swings downward, to the left, or to the right away from the opening 126. Further suitable examples of covers or doors are disclosed in U.S. Pat. No. 8,523,220, titled STRUCTURE MOUNTED AIRBAG ASSEMBLIES AND ASSOCIATED SYSTEMS AND METHODS and U.S. patent application Ser. No. 14/384,655, titled STRUCTURE MOUNTED AIRBAG ASSEMBLIES AND ASSOCIATED SYSTEMS AND METHODS, which are both incorporated herein by reference in their entireties.

In various embodiments, one or more lanyards 131 (e.g., made from seat belt webbing, airbag, and/or other suitable materials) can also secure or retain the door 134 to the housing 120. For example, the lanyards 131 can retain the door 134 to the housing 120 when the airbag deploys and release the frangible fasteners to prevent the door 134 from flying through the aircraft cabin. In other embodiments, hinges and/or other suitable coupling mechanisms (in addition to or in lieu of the lanyard(s) 131) can be used to secure the door 134 to the housing 120 during and after airbag deployment.

In the illustrated embodiment, the longitudinal axis 103 extends between the front and rear end of the aircraft, and a transverse axis 105 extends generally perpendicular to the longitudinal axis 103 between opposite sides of the aircraft (e.g., between opposing wings). In the nominal seated position, the legs 135 (e.g. upper legs) of the seated occupant 101 extend generally parallel to the transverse axis 105. As described in greater detail below, the airbag stored in the housing 120 can be deploy outward through the opening 126 substantially along the transverse axis 105 in response to a rapid deceleration, crash, or other significant dynamic event (e.g., during a 16G impact event). The airbag deploys toward a side of the aircraft opposite the side the seat 102 is positioned on (e.g., toward the aisle or middle portion of the aircraft).

When deployed, the airbag is expected to prevent (e.g., inhibit) leg flail greater than or equal to about 35 degrees relative to the nominal seated position of the occupant 101 (e.g., the transverse axis 105). In other embodiments, leg flail greater than or equal to about 30 degrees, or greater than or equal to about 25 degrees, or greater than or equal to about 20 degrees, or greater than or equal to about 15 degrees, or greater than or equal to about 10 degrees, or greater than or equal to about 5 degrees and/or any value therebetween relative to the nominal seated position of the occupant 101 is expected to be prevented by the deployed airbag.

Figure 2A:
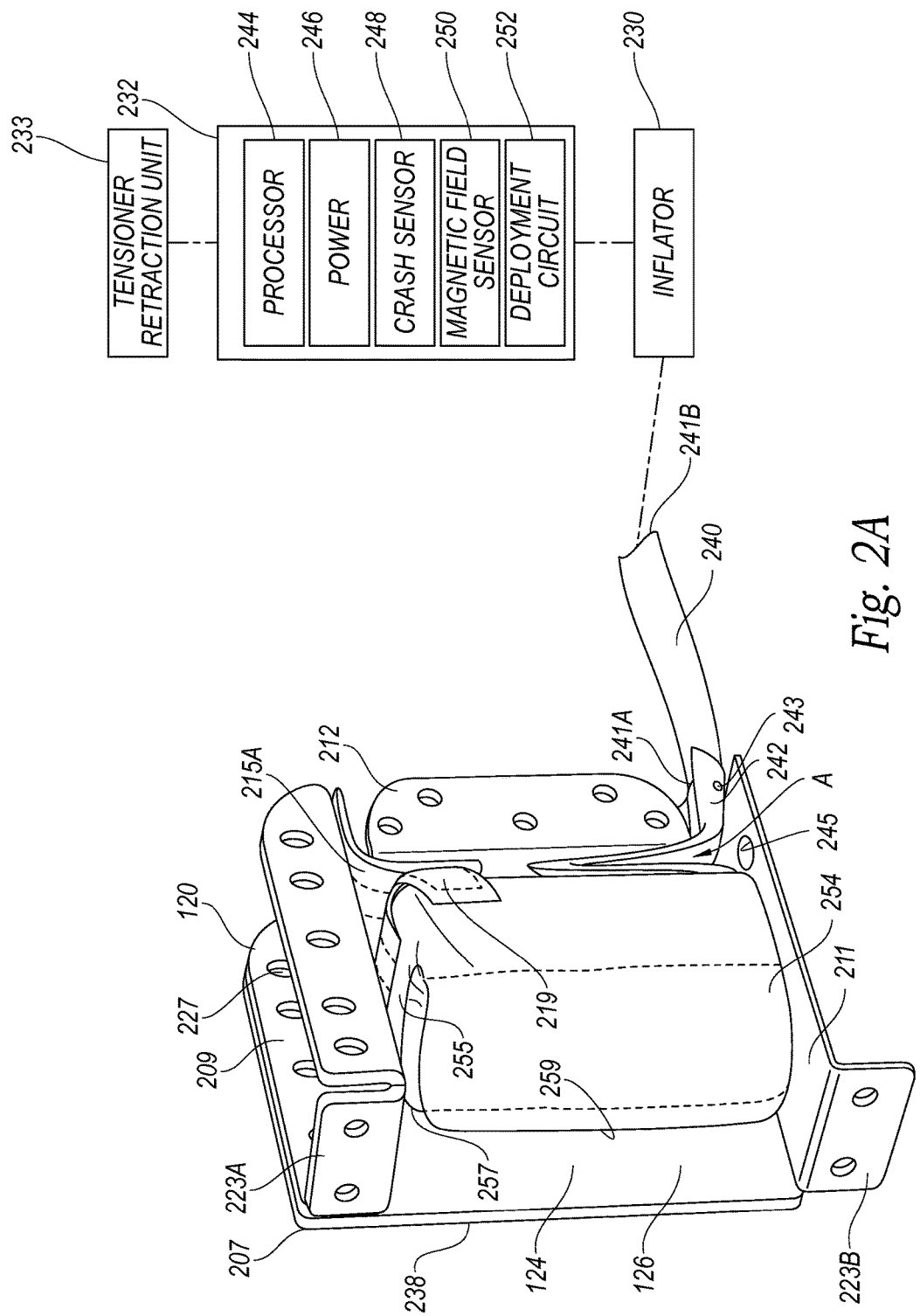
FIGS. 2A-2C are partially schematic front isometric views of the structure mounted airbag system of FIG. 1 with an airbag in a stowed configuration, partially deployed configuration, and a fully deployed configuration, respectively.
Figure 2B:
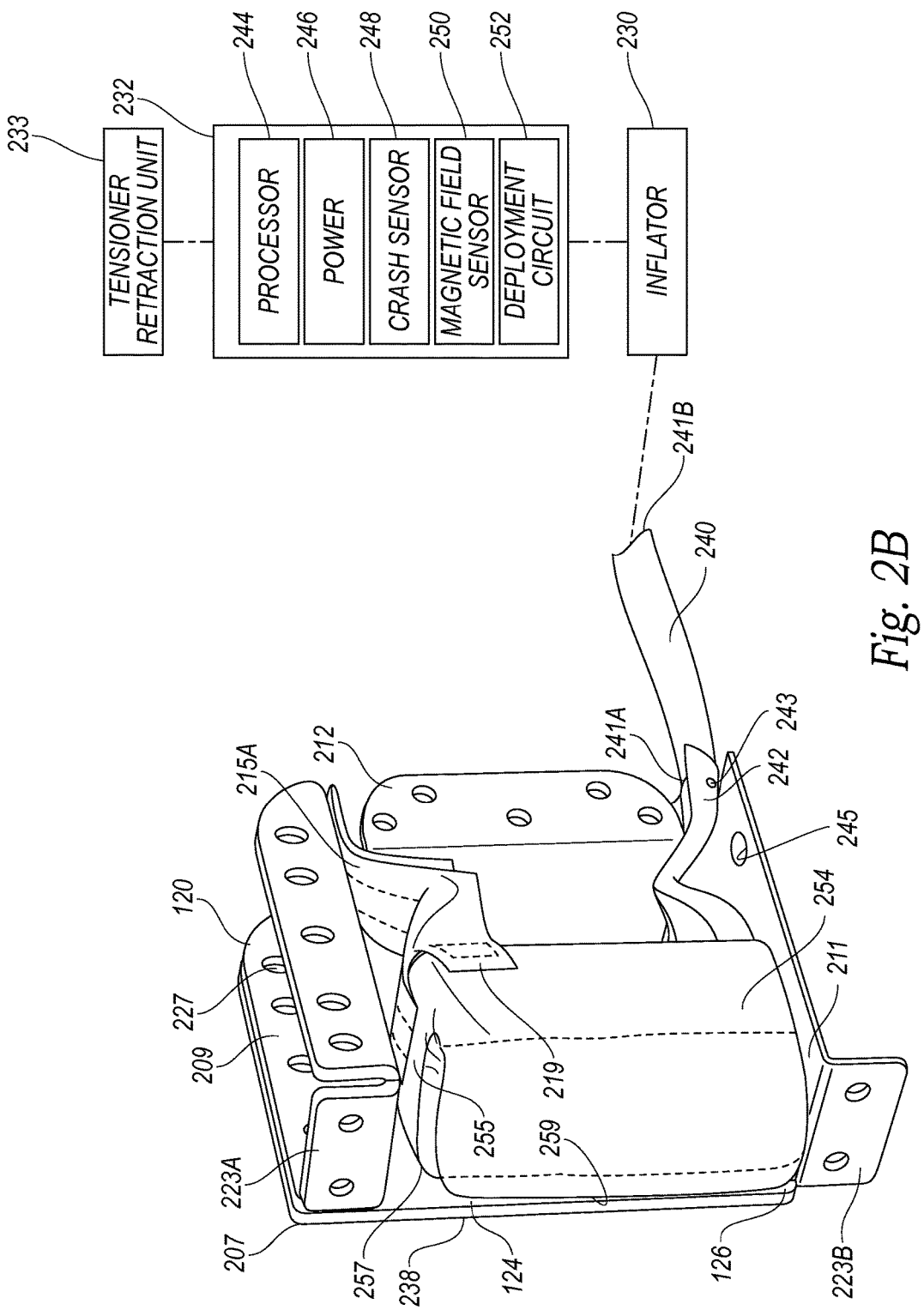
Figure 2C:
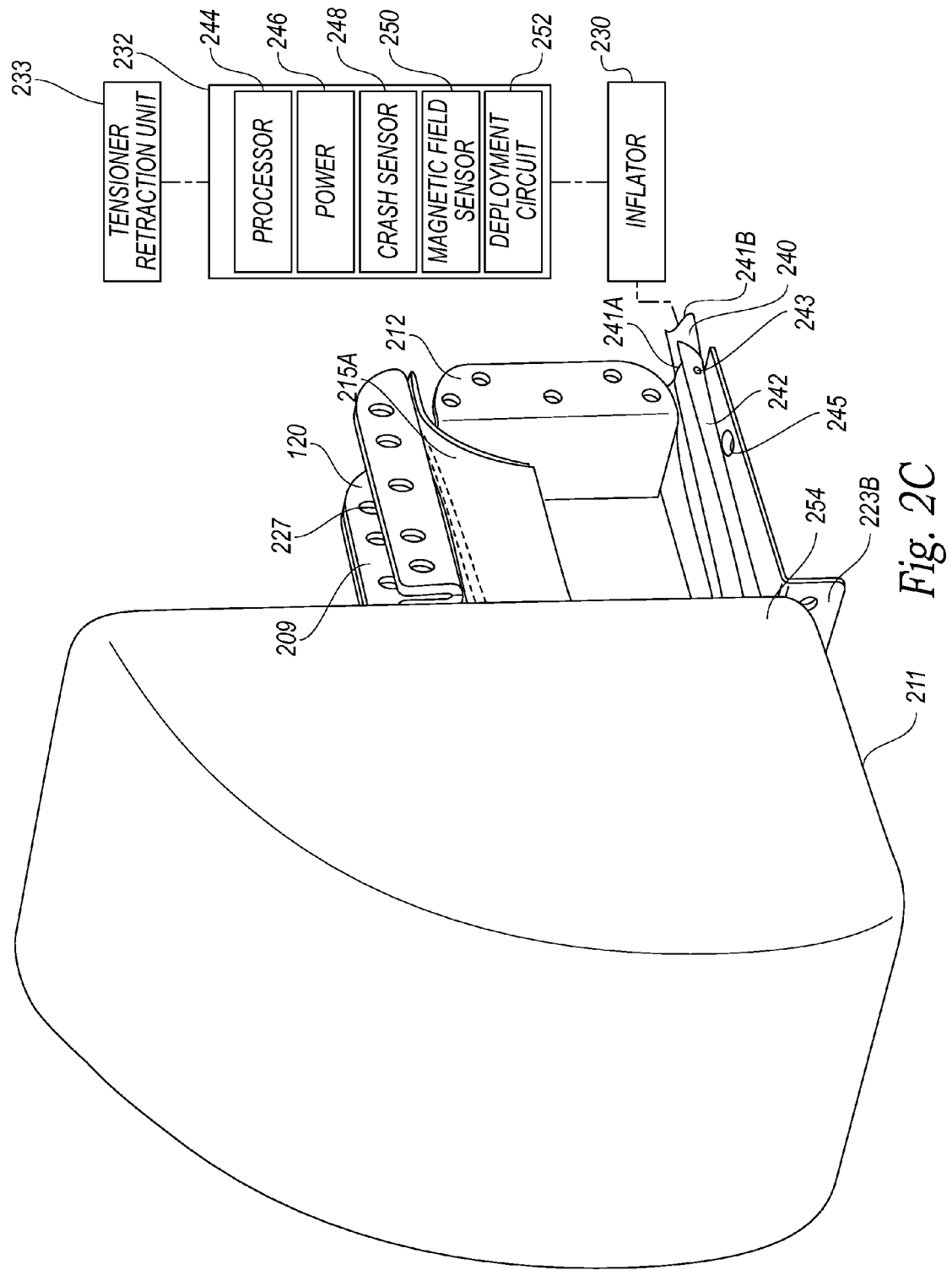

FIGS. 2A-2C illustrate partially schematic front isometric views of the structure mounted airbag system of FIG. 1 with the airbag 254 in a stowed configuration, partially deployed configuration, and a fully deployed configuration, respectively. Portions of the housing 120 are removed in FIGS. 2A-2C to illustrate other features of the airbag system 100 in more detail. Referring to FIGS. 2A-2C together, the housing 120 includes a plurality of walls or plates 207 assembled or secured together to form a generally rectangular cross-sectional shape. Opposing side plates 238 are mounted or secured to an upper plate 209, a lower plate 211, and a rear plate 212 to form the cavity 124 and opening 126 of the housing 120. The airbag 254 is stowed in the cavity 124 in line with the opening 126 such that the airbag 254 can deploy through the opening 126. In other embodiments, the housing 120 can have other suitable cross-sectional shapes.

Each of the plurality of plates 207 can include mounting apertures or openings 227 (e.g., counterbores or chamfered countersinks) configured to receive suitable fasteners (e.g., screws, nuts, bolts, pins, etc.) for securing the plates 207 together and other components of an airbag assembly 228 (e.g., the airbag 254, a gas delivery hose 240, tethers 215, etc.) to the housing 120 as described in more detail below. The use of counterbores or countersinks can provide substantially flush mountings. Lock-tight fasteners can be used to prevent unintentional disengagement or back-out of the fasteners due to vibrations from aircraft operation. Additionally, the mounting openings 227 can receive suitable fasteners to secure the housing 120 to the floor, seat, or other substantially fixed interior structure or monument. In other embodiments, the plates 207 can be integrally formed (e.g., monolithically formed, welded, or co-molded together). For example, the rear plate 212 can be integrally formed with one or more of the other plates 207. This can reduce the size or footprint of the housing 120 and the number of fasteners relative to separately formed and secured plates.

In one aspect of the illustrated embodiment, the airbag 254 can be secured to the housing 120, seat via one or more first tethers 215A or other suitable attachment features. A first end portion of the tether 215A can include one or more tabs 219 sewn or otherwise secured to a rear portion of the airbag 254. A second end portion of the tether 215A can have mounting apertures or openings 521 (FIG. 5) configured to be aligned with one or more corresponding openings 327A (FIG. 3) in the upper plate 209 and receive fasteners for attachment to the housing 120. The tether 215A can be secured to the upper plate 209 rearward of or behind the rear plate 212. By securing the tether 215A in this manner, the corresponding fasteners can be located outside the cavity 124 that the airbag 254 is stowed in and deploys from. The tether 215A can prevent the airbag 254 from detaching from the housing 120 and ejecting out into the aircraft cabin. The tether 215A can be made out of the same material as the airbag 254 or other suitable materials.

In other embodiments, the tether 215A can be secured to other portions of the housing 120. For example, the upper and lower plates 209, 211 can include tab or projection portions 223A, 223B (e.g., flanges). The projection portions 223A, 223B extend from front end portions of the upper and lower plates 209, 211, respectively. The projection portions 223A, 223B can provide additional securement positions (e.g., one or more apertures) for the tether(s) 215A. The projection portions 223A, 223B can also act as spacer features such that the airbag 254 does not rub against or contact the seat 102 or another substantially fixed structure to which the housing 120 is mounted during deployment. In other embodiments, the door 134 (e.g., the lanyards 131, fasteners, etc.) can be secured to one of the projection portions 223A, 223B of the housing 120.

In one aspect of the illustrated embodiment, the airbag system 100 can further include an airbag inflator 230 (shown schematically) in fluid communication with the airbag 254, and an electronics module assembly 232 (shown schematically) operably coupled to the inflator 230. The electronics module assembly 232 can be operably coupled to one or more inflators 230 to control inflation of one or more airbags 254. The inflator 230 can include a container of compressed gas (e.g., air, helium and argon mixture) and a pyrotechnic device (e.g., a squib connector) that can be activated by a signal sent by the electronics module assembly 232 in response to a crash or other significant dynamic event. The signal initiates the squib, which causes the container to release the expanding gas into the airbag 254. In other embodiments, the inflator 230 can include other suitable initiation and/or inflation devices (e.g., gas-generating inflators) known in the art.

The inflator 230 can be positioned within the airbag 254. In other embodiments, the inflator 230 can be spaced apart from the airbag 254 (e.g., remotely located away from the airbag 254 and/or housing 120) and fluidly coupled thereto using the gas delivery hose 240 or other suitable fluid passageway or conduit. A remotely positioned inflator 230, for example, can be mounted in any suitable orientation and secured to a portion of the aircraft (e.g., under the housing 120, under the floor of the aircraft proximate the housing 120, etc.) using brackets and/or other suitable mounting structures that can withstand loads encountered during normal aircraft operation, gas deployment from the inflator 230, a crash, and/or certain impact loads (e.g., loads applied under a 16g dynamic test). The gas delivery hose 240 can be made from a suitable flexible material that can accommodate the remote positioning of the inflator 230 relative to the airbag 254 and yet be durable enough to withstand regular wear and tear (e.g., the delivery of the expanding gas to the airbag 254). The modular positioning of the inflator 230 with respect to the airbag 254 provided by the gas delivery hose 240 allows the airbag system 100 to accommodate the space constraints of the housing 120 and the aircraft cabin. In other embodiments, the gas delivery hose 240 can be omitted, and the outlet of the inflator 230 can be positioned in direct fluid communication with the airbag 254.

The gas delivery hose 240 can include a first end portion 241A in fluid communication with the interior of the airbag 254 and a second end portion 241B including a connector (e.g., an inflator connector as disclosed in U.S. Pat. No. 8,439,398, entitled "INFLATOR CONNECTORS FOR INFLATABLE PERSONAL RESTRAINTS AND ASSOCIATED SYSTEMS AND METHODS", which is incorporated herein in its entirety by reference) threadably or otherwise engaged with an outlet of the inflator 230. The gas delivery hose 240 can be suitably sized for rapid gas delivery to the airbag 254 depending at least in part on the distance between the inflator 230 and the airbag 254.

The gas delivery hose 240 can include a fitting or fabric tube 242. The fabric tube 242 includes a first portion extending into and secured (e.g., sewn) to the airbag 254 (FIG. 4A). A second portion of the fabric tube 242 extends out from the airbag 254 and receives the hose 240 (e.g., the first portion 241A). The hose 240 extends into the airbag 254 through the fabric tube 242 and can be secured inside the airbag 254 (FIG. 4A) and/or to the fabric tube 242 as described in greater detail below. The fabric tube 242 is expected to provide a tighter fit or seal between the hose 240 and portion of the airbag 254 (e.g., slit or opening) where the hose 240 enters the airbag 254. The hose 240 can be in fluid communication with the interior of the airbag 254 via one or more diffuser openings as described in greater detail below. A first portion of the gas delivery hose 240 and/or fabric tube 242 can be attached to the airbag 254 and a second portion of the gas delivery hose 240 and/or fabric tube 242 can be attached to the housing 120 to tether the airbag 254 to the housing 120. For example, in some embodiments, the second portion of the fabric tube 242 can be secured to the housing 120 to provide a second or lower tether (e.g., a pass-through tether for the hose 240) for securing the airbag 254 to the housing 120 in addition to, separate from, or in place of the tether 215A. In some embodiments, a second or lower tether (not shown) can be used to secure the airbag 254 to the housing 120 separate from or in addition to the fabric tube 242 or hose 240. The fabric tube 242 can include one or more openings or apertures 243 configured to be aligned with corresponding openings 327B (FIG. 3) in one or more of the side plates 238 of the housing 120 to receive suitable fasteners for securing the fabric tube 242 to the housing 120. The fabric tube 242 can be secured to the side plates 238 behind or rearward of the rear plate 212 such that the fasteners are positioned outside the interior (e.g., cavity 124) of the airbag 254. The fabric tube 242 can be made from the same material as the airbag 254. In other embodiments, the fabric tube 242 can be made from other suitable materials.

The housing 120 can include an opening or aperture 245 (e.g., an access port) in one of the plates 207 (e.g., the lower plate 211). The aperture 245 is sized to receive a tool (e.g., in the direction as indicated by arrow A) to induce at least one bend (e.g., coil or fold) in the hose 240 during assembly of the airbag system 100. Referring to FIGS. 2B-2C, when the airbag 254 deploys, as described in greater detail below, the bend in the hose 240 is sized such that when it inflates, the hose 240 straightens out and can push the airbag 254 out of the housing 120 so that the airbag 254 deploys outside or outward from the housing 120. For example, the airbag 254 is pushed outside of or away from the housing 120 before it is fully or completely inflated or reaches its fully deployed configuration (e.g., the majority of the airbag inflates or unfolds outside the housing 120) as shown in FIG. 2C. The aperture 245 is positioned forward of the rear plate 212 such that the at least one bend or coil inside the cavity 124 of the housing 120 is positioned forward of the rear plate 212. In other embodiments, however, the aperture 245 can be positioned rearward of the rear plate 212.

In the illustrated embodiment, the electronics module assembly 232 includes a processor 244 configured to receive electrical power from a power source 246 (e.g., one or more lithium batteries), a deployment circuit 252 configured to initiate the inflator 230, and at least one crash sensor 248 configured to detect rapid decelerations and/or other crash events. The crash sensor 248, for example, can include a spring-mass-damper type sensor with an inertial switch calibrated for the vehicle's operating environments that initiates airbag deployment upon a predetermined deceleration level. In other embodiments, the crash sensor 248 can include other suitable types of sensors known in the art, for example, as disclosed in U.S. patent application Ser. No. 13/170,079, titled SENSORS FOR DETECTING RAPID DECELERATION/ACCELERATION EVENTS, which is incorporated herein by reference in its entirety. Optionally, the electronics module assembly 232 can also include one or more magnetic field sensors 250 configured to detect the presence of an external magnetic field (e.g., from a speaker) and communicate with the processor 244 to deactivate the crash sensor 248 and prevent inadvertent deployment of the airbag 254. The magnetic field sensor 250 can include, for example, the circuitry disclosed in U.S. Pat. No. 6,535,115, titled AIRBAG HAVING EXCESSIVE EXTERNAL MAGNETIC FIELD PROTECTION CIRCUITRY, which is incorporated herein by reference in its entirety.

Similar to the inflator 230, the electronics module assembly 232 can also be positioned in various locations. For example, the electronics module assembly 232 can be housed within the cavity 124 or in a remote location proximate the housing 120 and coupled to the inflator 230 via suitable electrical connectors. The electronics module assembly 232, for example, can be positioned on the underside of the housing 120, under a seat, or elsewhere in the aircraft. When mounted remotely, the electronics module assembly 232 can be positioned to properly transmit the crash pulse and reduce vibration effects.

Figure 5:
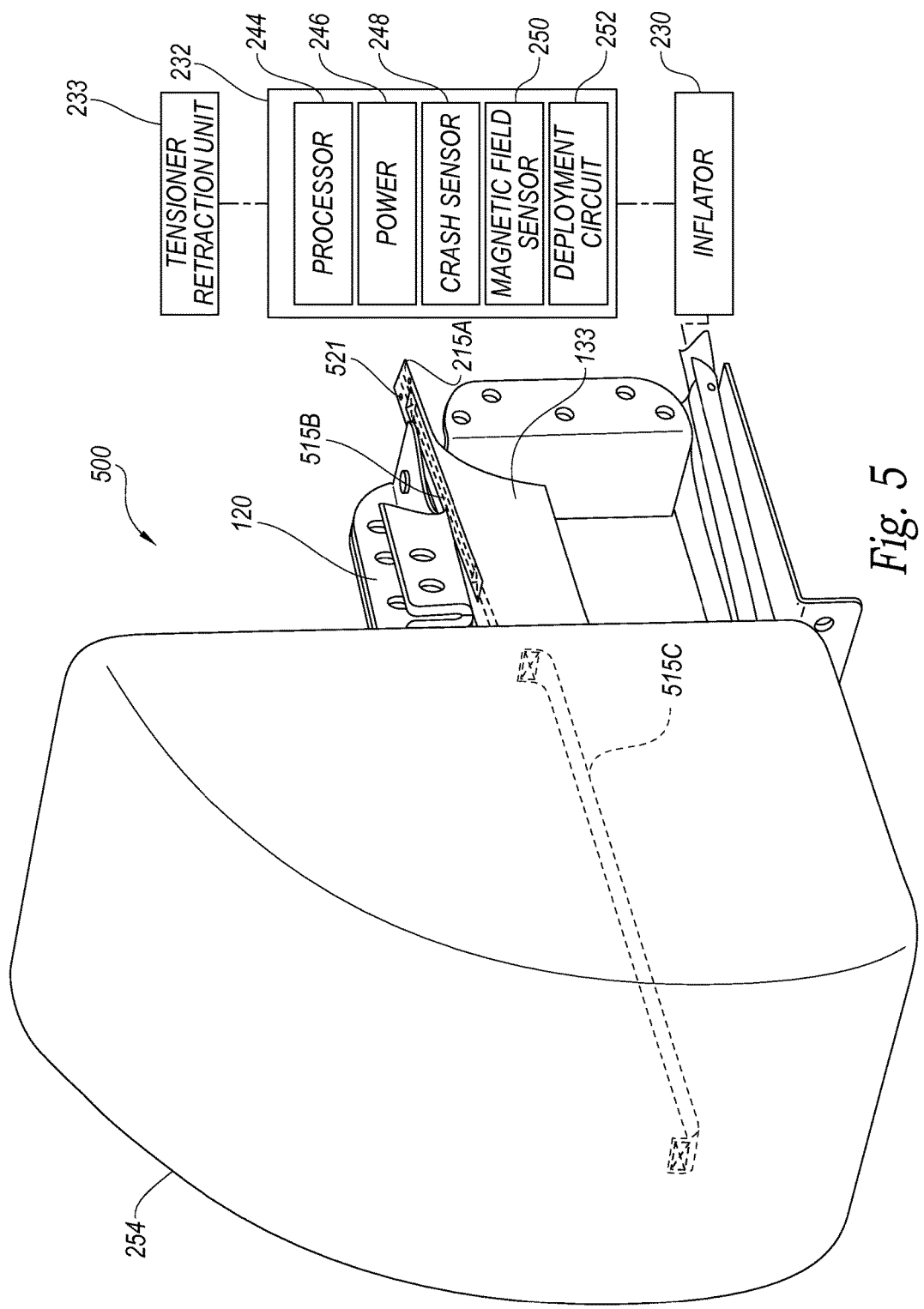
FIG. 5 is a partially schematic front isometric view of a structure mounted airbag system with the airbag in a deployed configuration in accordance with another embodiment of the present technology.

In other embodiments, the electronics module assembly 232 can include other types of sensors and/or additional features to aid in airbag deployment and/or retraction. For example, the airbag system 100 can include an active retraction feature. In such embodiments, the electronics module assembly 232 can include and/or be electronically coupled to a tensioner retraction unit 233 programmed to initiate, trigger, activate or fire on a time delay (e.g., pre-programmed) after a period of time after the airbag 254 is deployed (and/or a crash or other significant dynamic event is detected). In certain embodiments, the period of time can be about 10 minutes, or about 1 minute, or about 100 seconds, or about 10 seconds, or about 1 second, or about 100 milliseconds, or about 10 milliseconds, or about 1 millisecond, and/or any value therebetween. The tensioner retraction unit 233 can be activated (e.g., to release a vent and/or pull a tether or hose) to deflate and/or retract the airbag 254 in order to provide or enable egress for occupants as described in greater detail below (FIG. 5).

In some embodiments, the components of the electronics module assembly 232 can be housed in a protective cover (e.g., a machined or injection-molded plastic box) that reduces the likelihood of damage to the electronics module assembly 232 therein and a magnetic shield configured to prevent the electronics module assembly 232 from inadvertently deploying the airbag 254. In other embodiments, the electronics module assembly 232 can be stored in a housing as disclosed in U.S. Patent App. Publication No. 2013/0187646, entitled ELECTRONIC MODULE ASSEMBLY FOR INFLATABLE PERSONAL RESTRAINT SYSTEMS AND ASSOCIATED METHODS, which is incorporated herein by reference in its entirety, and/or other suitable electronics housings known in the art. In further embodiments, the electronics module assembly 232 can include diagnostic testing features, such as those described in U.S. Patent App. Publication No. 2012/0259484, entitled INFLATABLE PERSONAL RESTRAINT SYSTEMS and U.S. Pat. No. 8,818,759, entitled COMPUTER SYSTEM FOR REMOTE TESTING OF INFLATABLE PERSONAL RESTRAINT SYSTEMS, which are both incorporated herein by reference in their entireties.

Referring to FIGS. 2A-2C together, during a crash or other significant dynamic event above a predetermined threshold, the crash sensor 248 can close one or more switches, thereby causing the processor 244 to send a corresponding signal to the deployment circuit 252. Upon receiving a signal from the processor 244, the deployment circuit 252 can apply a sufficient voltage to an igniter (e.g., a squib), causing the inflator 230 to discharge its compressed gas into the airbag 254 via the gas delivery hose 240. The compressed gas inflates and "straightens out" the gas delivery hose 240 as illustrated in the partially deployed and deployed airbag configurations of FIGS. 2B and 2C. As the gas delivery hose 240 straightens out during inflation, it pushes the airbag 254 out of the housing 120 before the airbag 254 fully or completely inflates (e.g., unfurls, unrolls, unfolds, etc.). This is expected to reduce the load (e.g., pressure or stress) on the housing 120 because a majority of the airbag 254 deploys and inflates outside the housing 120 rather than against an interior portion of the housing 120 (e.g., one or more plates 207) which can reduce or decrease the required thickness or robustness of the housing 120 or other structure for stowing the airbag 254 (e.g., reducing size, footprint, weight, etc.). The airbag 254 is pushed outward through the opening 126 in the housing 120 prior to fully or completely inflating to the fully deployed configuration illustrated in FIG. 2C. The primary force or motion of the airbag 254 upon initial airbag inflation is expected to be forward to push the airbag 254 out of the housing 120 before the airbag 254 is inflated to its fully deployed configuration. While some air or other gas is expected to be released into the airbag 254 upon initial inflation, the majority of the inflation (e.g., unfolding, unfurling, etc.) of the airbag 254 is expected to occur outside the housing 120 or away from the seat.

In certain embodiments, because the airbag 254 is pushed forward outside the housing 120 or other opening before fully inflating, the airbag 254 can be set back or rearward of the front of the housing 120 (e.g., door, opening, etc.). The airbag 254 does not need to be positioned flush or substantially flush against the door or front portion of the housing 120 or other opening. For example, the airbag 254 can be positioned a distance up to about 6 inches, 12 inches, 18 inches, 24 inches, 30 inches, and/or any value therebetween rearward or in back of the front of the housing 120. The bend in the hose 240 and/or fabric tube 242 can be sized such that when it is inflated and straightens out, the airbag 254 is pushed this distance out of the housing 120 or other opening before the airbag 254 is fully inflated. Therefore, it is expected that the hose 240 completely inflates prior to the airbag 254 fully or completely inflating as the hose 240 pushes the airbag 254 forward before it fully inflates. In some embodiments, setting the airbag 254 rearward of the front of the housing 120 is also expected to allow the opening the airbag 254 deploys from to be reduced or decreased relative to airbags that are positioned flush or substantially flush against the front of the housing 120. For example, in some embodiments, such airbags can be folded more to reduce size of the stowed airbag 254. In some instances, airbags positioned flush or substantially flush with the front of the housing 120 may be required to inflate substantially to exit the opening or push a door away from the opening. Such airbags may have to be folded less, increasing their size and opening they deploy from along with the size and weight of the housing they are configured to deploy from.

In one aspect of the illustrated embodiment, the airbag 254 is rolled (e.g., folded) and stowed in the housing 120 in a specific manner such that the side closest to the seated occupant unfurls or unfold first as the airbag 254 is inflated. For example, as illustrated in FIG. 2A, the airbag 254 is rolled and stowed such that first, a top portion 255 of the airbag 254 is rolled downward onto itself. Next, a first side portion 257 (e.g., a right side portion) of the airbag 254 farthest away from occupant is rolled inwardly over the top portion. Then a second side portion 259 (e.g., a left side portion) of the airbag 254 closest to the occupant is rolled over the first side portion 257. During airbag deployment, after the airbag 254 is pushed out of the housing 120, the airbag 254 inflates to the deployed configuration shown in FIG. 2C. The second side portion 259 unrolls first in a direction towards the occupant. Then the first side portion 257 unrolls toward the opposite side of the second side portion 259 away from the occupant and the top portion 255 unrolls upward above the housing 120 and against a front portion of the seat. However, in other embodiments, the airbag 254 can be rolled and stowed in the housing 120 such that first side portion 257 farthest away from occupant unrolls first in a direction away from the occupant before the second side portion 259 closes to the occupant unrolls in a direction toward the occupant when the airbag 254 is inflated.

As described above, the door 134 or cover (if provided with one) can move away from the opening 126 (e.g., due to the force applied by the deploying airbag 254), allowing the airbag 254 to expand outward, forward of the occupant's legs in the corresponding seat 102. The lanyards 131 can retain the door 134 to the housing 120 such that it does not interfere with the occupant egress. In other embodiments, the door 134 can be actively moved away prior to airbag deployment.

Figure 3:
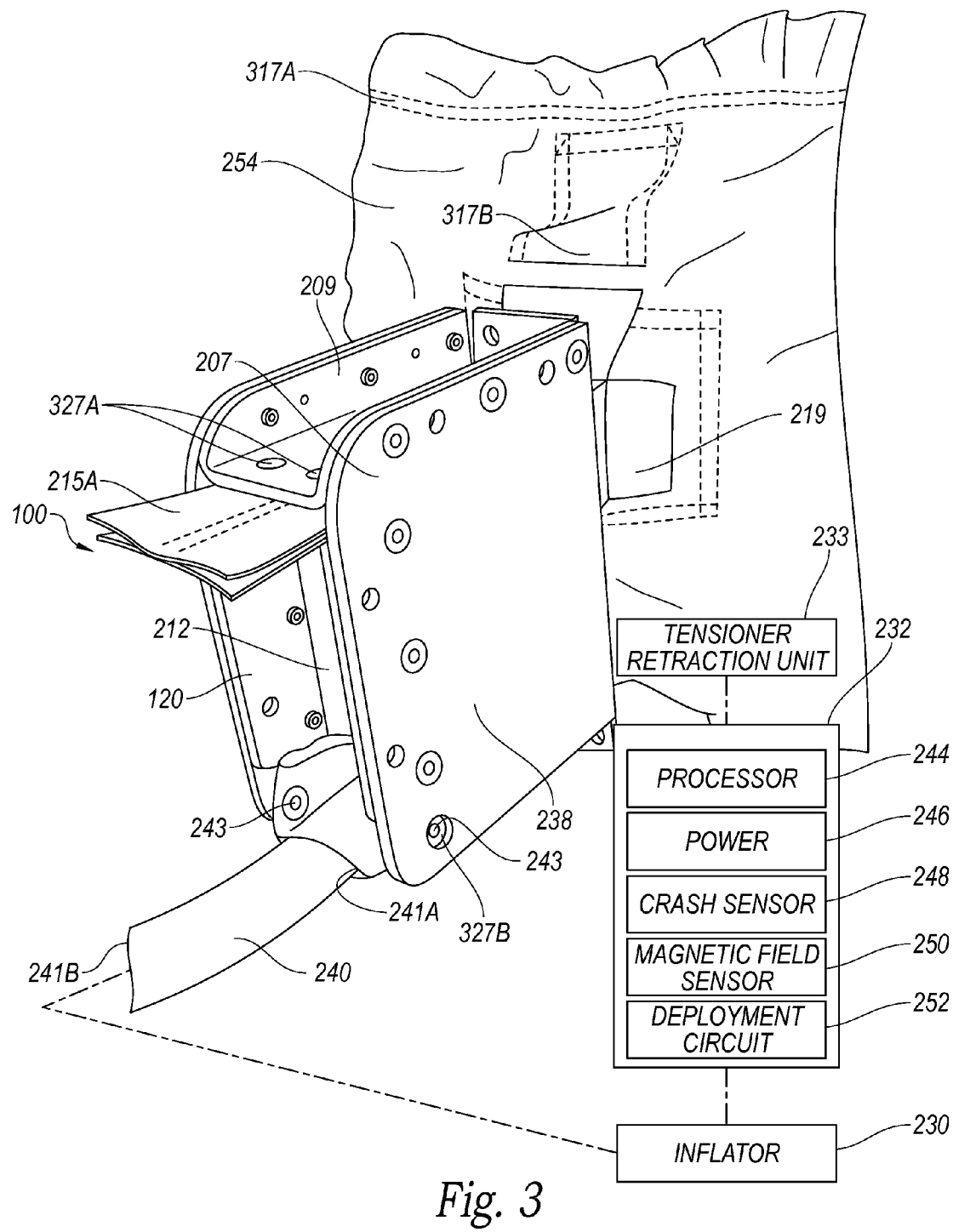
FIG. 3 is a partially schematic rear isometric view of a portion of the structure mounted airbag system of FIG. 1 with the airbag in a deployed configuration.
Figure 4A:
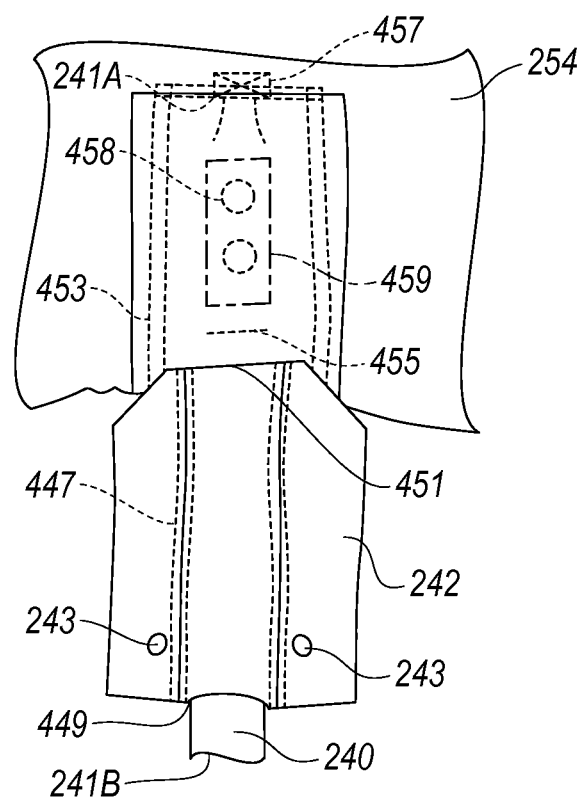
FIG. 4A is a bottom view of a portion of the airbag configured in accordance with an embodiment of the present technology.

FIG. 3 is a partially schematic rear isometric view of a portion of the airbag system 100 with the airbag 254 in the deployed configuration. The scale of the airbag 254 has been enhanced merely for purposes of illustration, and it will be appreciated that the airbag 254 may have a different size/arrangement relative to the housing 120. As shown in FIG. 3, the airbag 254 can include one or more first vents 317A (only one is shown) that open or unseal when the pressure within the airbag 254 reaches a predetermined threshold. The vent 317A, for example, can be a discrete seam (e.g., a rip seam) on the airbag 254 that is sewn shut and tears open at a designated pressure (e.g., when the occupant contacts the airbag 254 and/or when the airbag 254 is fully inflated). This feature can limit the force with which the seat occupant's legs 135 impacts the airbag 254 and reduces the rebound of the occupant 101 from the airbag 254. The vent 317A can also allow the airbag 254 to deflate rapidly (e.g., within seconds) after inflation so it does not impede occupant egress from the seat 102 in an emergency situation.

In other embodiments, the airbag 254 can include one or more second vents 317B (only one is shown) that help the airbag 254 deflate rapidly (e.g., within seconds) after inflation. For example, the vent 317B can be positioned on a rear portion of the airbag 254. As the airbag 254 deploys and inflates, the second vent 317B (e.g., seam) is sealed against a structure in the interior of the aircraft (e.g., seat, armrest, or other fixed monument) but as the pressure drops (e.g., below a certain threshold) after deployment or during retraction (e.g., from gas released through the first vent 317A), the vent 317B becomes unsealed and additional gas is released from the vent 317B to deflate the airbag 254 more rapidly. An occupant or other person can further apply force against the airbag 254 to increase the release of gas through the vents 317A and/or 317B. The vents 317A and/or 317B can be combined with one or more tethers to provide a first or passive retraction feature as described in more detail below.

FIG. 4A is a bottom view of a portion of the airbag 254 configured in accordance with an embodiment of the present technology. As best seen in FIG. 4A, the fabric tube 242 includes one or more layers of fabric sewn together with first stitching 447 and a first opening 449 for receiving the gas delivery hose 240. The fabric tube 242 extends into the airbag 254 through a slit or opening 451 and is sewn to the interior of the airbag 254 with second stitching 453. The gas delivery hose 240 can be inserted into the airbag 254 through the first opening 449 in the fabric tube 242. The gas delivery hose 240 can extend out of the fabric tube 242 through a second opening 455 inside the airbag 254 opposite the first opening 449 and be sewn to the airbag 254 with third stitching 457. One or more diffuser openings 458 in the gas delivery hose 240 above the second opening 455 allow gas to be released into the airbag 254. As illustrated, in some embodiments the fabric tube 242 can include a stiffener 459 (e.g., a plate) secured between the one or more layers of fabric that form the fabric tube 242. The stiffener can be made of plastic, metal, or other suitable materials.

Figure 4B:
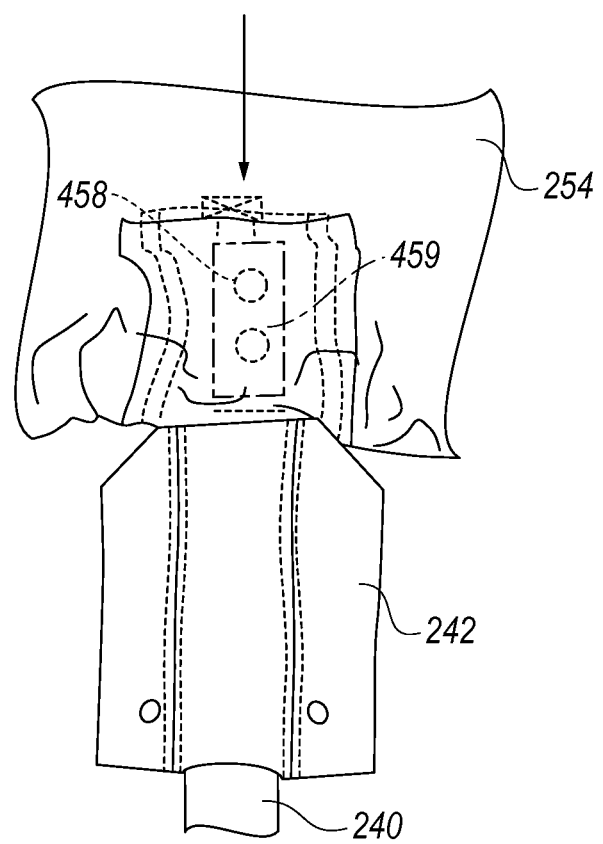
FIG. 4B is a bottom view of the same portion of the airbag in a deployed configuration.

FIG. 4B is a bottom view of the same portion of the airbag 254 of FIG. 4A shown in a deployed configuration. In operation, the stiffener 459 is expected to reduce or prevent buckling (deforming or collapsing) of the fabric tube 242 and/or portions of the airbag 254 secured to the fabric tube 242 when the airbag 254 is pressurized or inflated to the deployed configuration. The stiffener 459 is expected to reduce the likelihood of the hose 240 and/or portions of the airbag 254 attached to the gas delivery hose 240 being pulled back or rearward out of the airbag 254 through the opening 455 and into the fabric tube 242 (in the direction indicated by the arrow). This prevents gas from being released from diffuser openings 458 of the gas delivery hose 240 into the fabric tube 242 instead of the airbag 254. If gas is released into the fabric tube 242 instead of the airbag 254, the airbag 254 may not deploy properly.

FIG. 5 is a partially schematic front isometric view of a structure mounted airbag system 500 configured in accordance with another embodiment of the present technology that includes additional tethers. The airbag system 500 includes one or more similar features as airbag system 100 with similar reference numbers referring to similar components. For example, the airbag 254 is shown in a deployed configuration with portions of the housing 120 removed merely for sake of illustration to more clearly show other features of airbag system 500. The airbag system 500 can include one or more second elastic tethers 515B (only one is shown) for retracting and/or deflating the airbag 254 to enable occupant egress after a crash or deceleration event. The second elastic tethers 515B can be secured (e.g., sewn or with other suitable fasteners) to the airbag 254 and/or the first tethers 215A. In some embodiments, the tethers 515B can be secured to various portions of the housing 120. During airbag deployment, the tethers 515B are stretched in tension. After deployment, the tethers 515B can pull the airbag 254 back to a retracted position (e.g., towards and/or back into the housing 120). Additionally, in some embodiments, the airbag 254 can include one or more third elastic tethers 515C (only one is shown) secured to opposing interior sides of the airbag 254. The third tethers 515C can assist the second tethers 215B in retracting and/or deflating the airbag 254 (e.g., releasing gas through the one or more vents or seams as the airbag 154 is pulled back to the retracted position). The tethers 515B and 515C can be made of any suitable elastic material.

The tensioner retraction unit 233 can be electronically coupled to one or more of the airbag tethers and/or vents described herein to retract and/or deflate the airbag 254. For example, the tensioner retraction unit 233 can be operably coupled or attached to one of the tethers (e.g., tethers 215A, 515B and/or 515C) for retracting and/or deflating the airbag 254 after a crash or deceleration event to enable occupant egress. Activation or initiation of the tensioner retraction unit 233 can be controlled by the electronics module assembly 232. For example, in some embodiments, a delayed timing signal can be programmed (e.g., hard-coded) into the memory (e.g., read-only memory) of the processor 244 of the electronics module assembly 232. A signal can be sent to an actuator (e.g., via a controller) for initiating or triggering the tensioner retraction unit 233 after a sensor (e.g., the crash sensor 248 or other sensor) detects a crash or other rapid deceleration event to retract and/or deflate the airbag 254 (e.g., by retracting the one or more tethers). Therefore, in certain embodiments, the tensioner retraction unit 233 can be referred to as a "post-tensioner retraction unit." This provides the airbag system 100 with an active retraction feature that can be used alone or in combination with the passive retraction features discussed above for occupant egress. In other embodiments, the post-tensioner retraction unit 233 can be operably coupled to one or more vents on the airbag 254. For example, the tensioner retraction unit 233 can be activated to release a vent as disclosed in U.S. Provisional Application No. 62/146,268, titled ACTIVE AIRBAG VENT SYSTEM, which is incorporated herein by reference in its entirety.

Figure 6A:
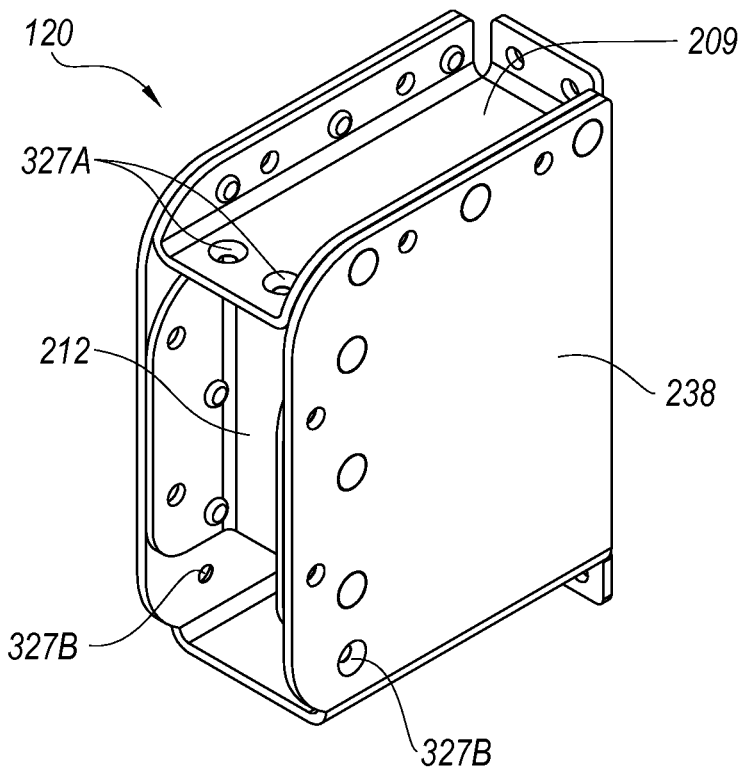
FIGS. 6A-6C are rear isometric, front isometric, and rear views, respectively, of an airbag housing configured in accordance with the present technology.
Figure 6B:
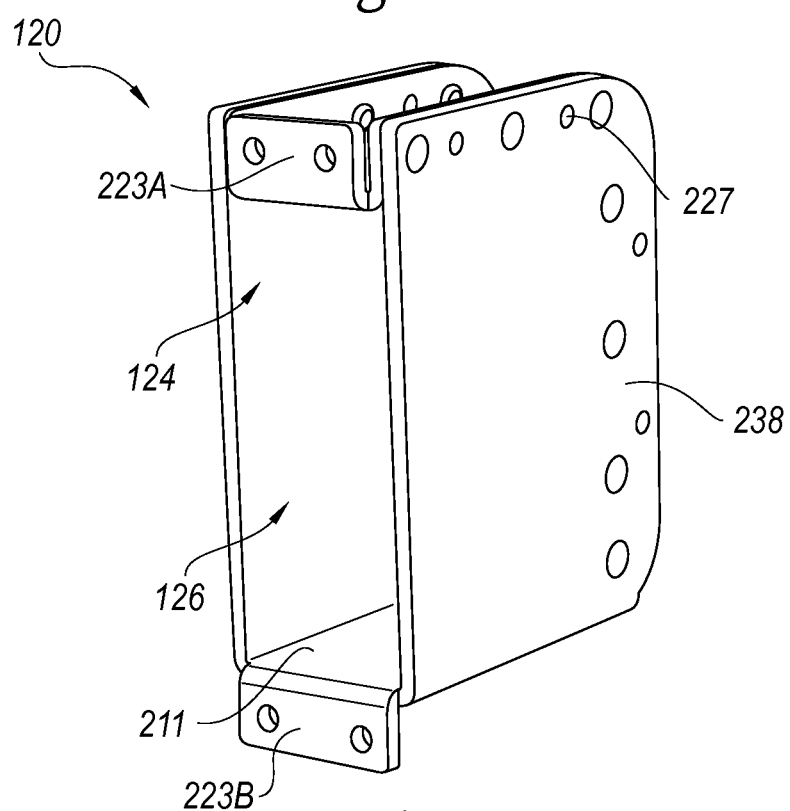
Figure 6C:
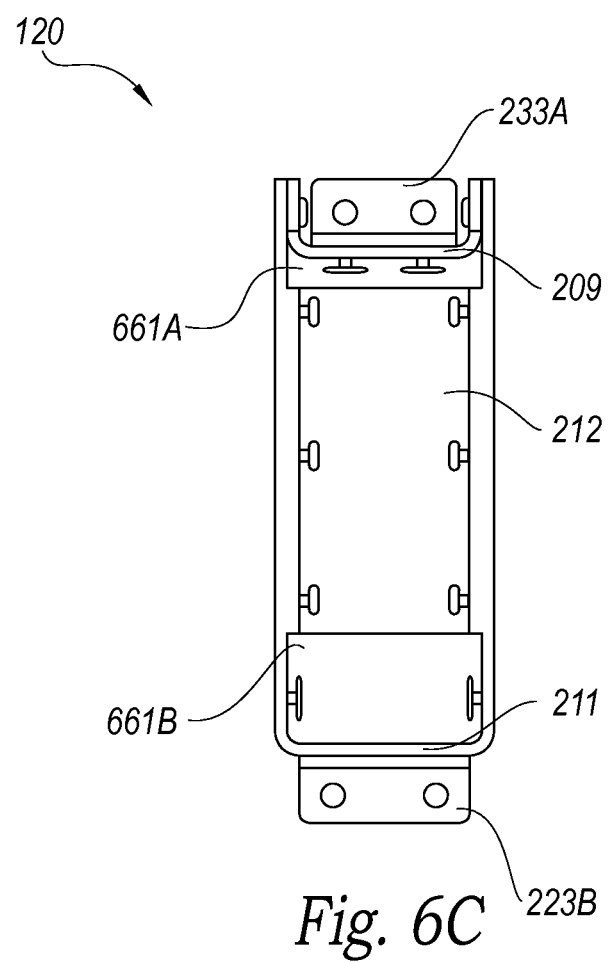

FIGS. 6A-6C are rear isometric, front isometric, and rear views, respectively, of the housing 120. Referring to FIGS. 6A-6C together, the housing 120 can include first and second openings 661A, 661B. The first opening 661A extends between a lower surface of the upper plate 209 and an upper surface of the rear plate 212. The second opening 661B extends between an upper surface of the lower plate 211 and a lower surface of the rear plate 212. The first and second openings 661A, 661B allow portions of the tether 215A and fabric tube 242 to extend in a general rearward direction out of the cavity 124 to be attached to portions of the housing 120 behind the rear plate 212 as described above with fasteners positioned outside the cavity 124.

Figure 7A:
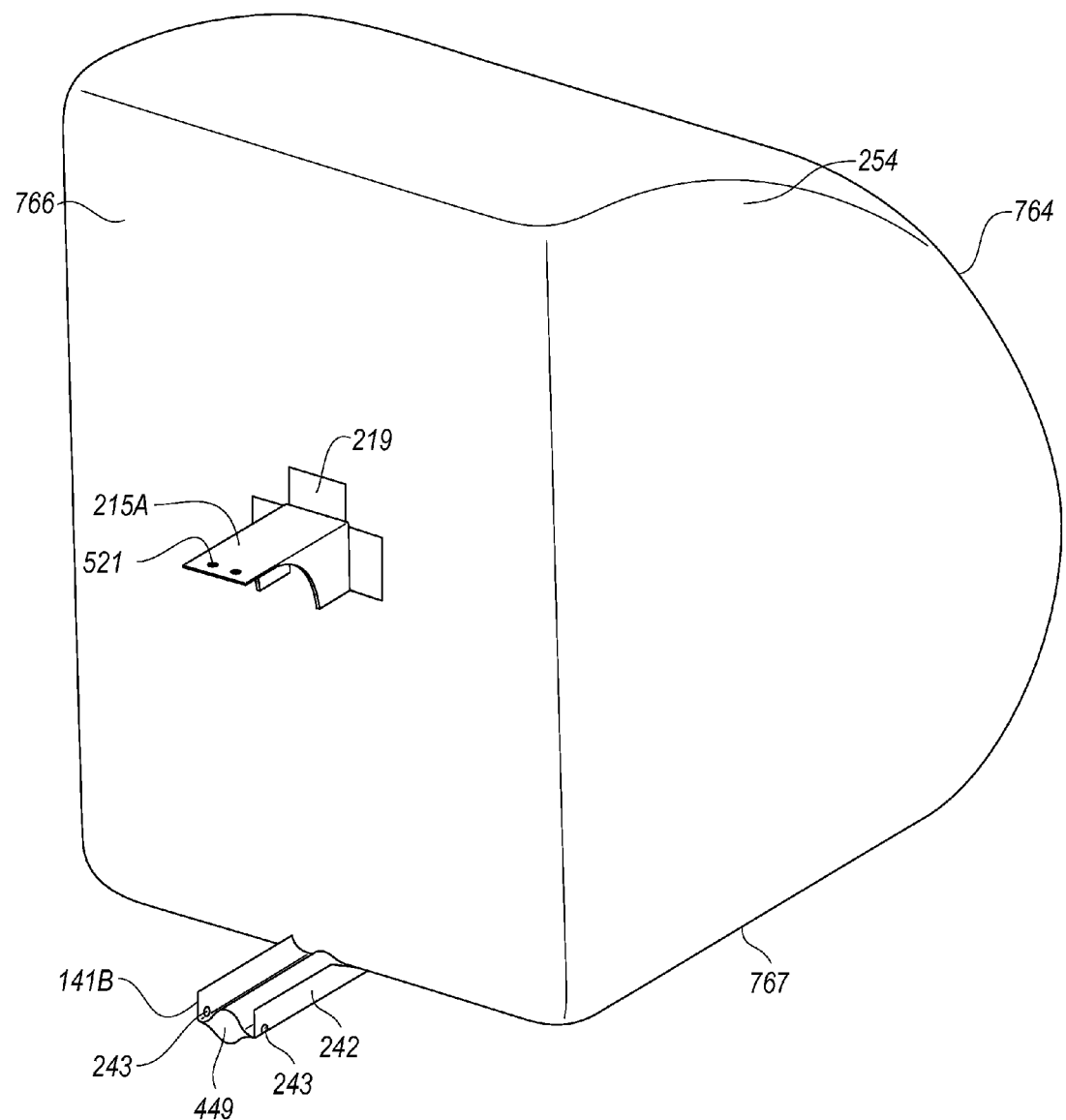
FIG. 7A is a rear isometric view.
Figure 7B:
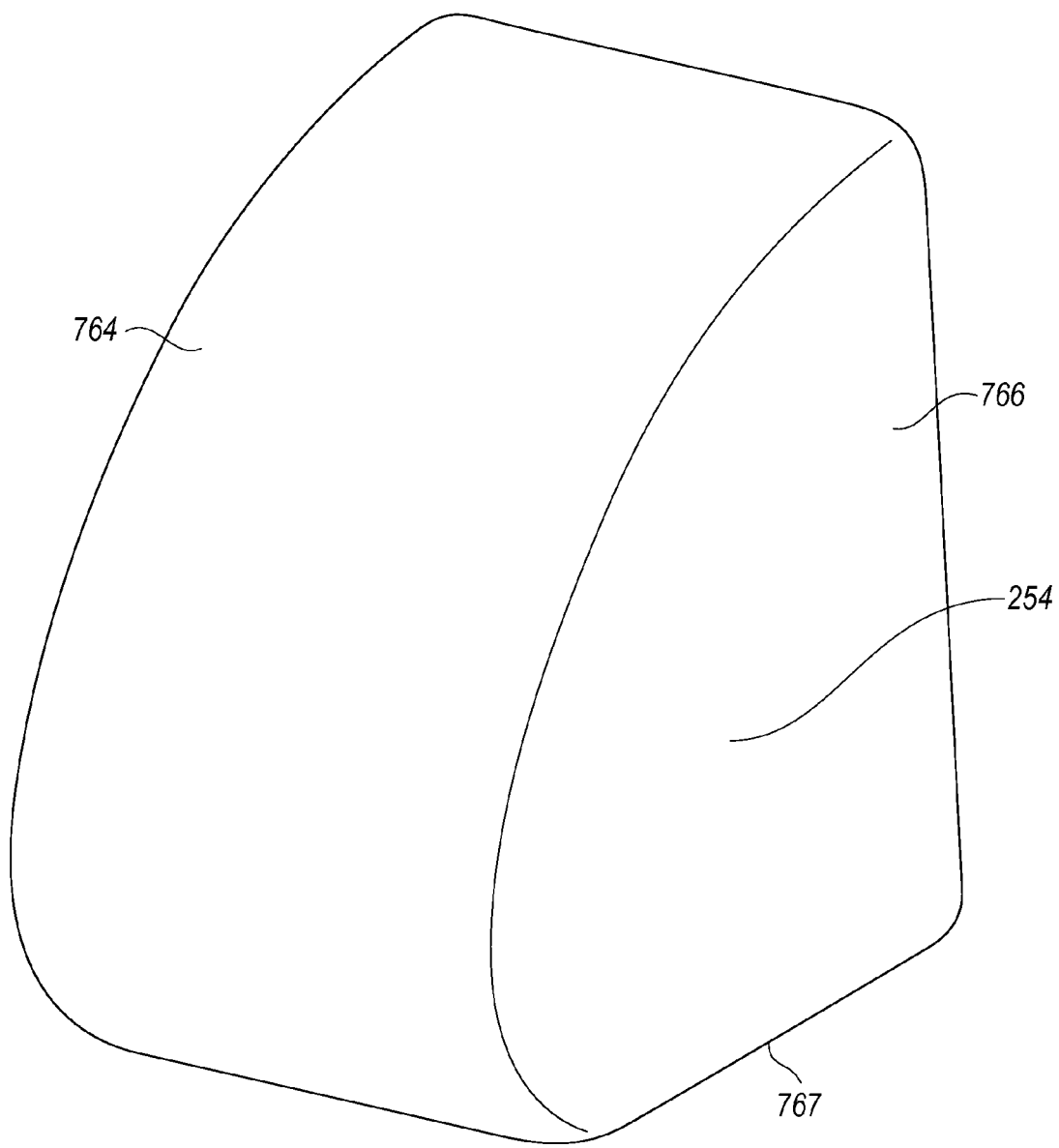
FIG. 7B is a front isometric view of the airbag of FIGS. 2A-5 in the deployed configuration.

FIGS. 7A and 7B are front and rear isometric views, respectively, of the deployed airbag 254. Again, the scale of the airbag 254 has been enhanced for purposes of illustration. In the illustrated embodiment, the airbag 254 can have a generally wedge-shaped profile or cross-sectional shape when deployed. For example, the airbag 254 can include a curved or arched first surface portion 764 (e.g., front portion). The airbag 254 further includes a generally planar rear or back portion 766 and base or bottom portion 767 that extend generally perpendicular to each other giving the airbag 254 a generally wedge or quarter-circle shaped cross-sectional shape. In certain embodiments, the wedge-shaped airbag 254 is expected to decrease the volume or size of airbag necessary to provide leg flail protection relative to other shaped airbags. This feature is also expected to reduce the size of the housing necessary to stow the airbag 254. For example, when the airbag 254 is deployed, the rear and base portions 766,767 can lie substantially flat or flush against the front of the seat and floor of the airplane, respectively. The rear and base portions 766,767 can extend substantially parallel to the front of the seat and floor of the airplane, respectively. The curved surface 764 can then extend substantially toward the other side of the airplane away from the rear surface 766 to catch the occupant's legs during a crash or other significant dynamic event.

Figure 10A:
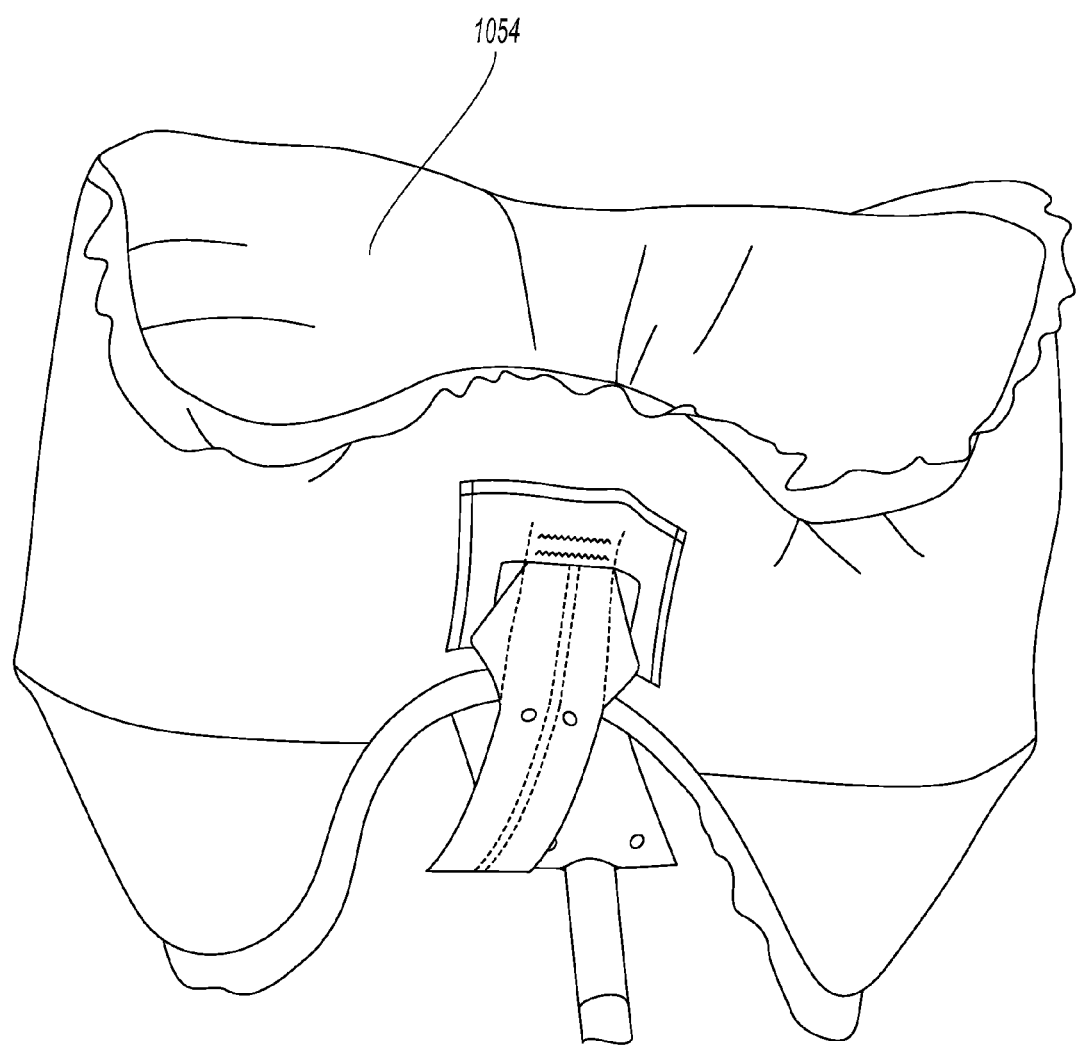
FIGS. 10A-10C are rear isometric, top isometric, and side isometric views, respectively, of a deployed airbag configured in accordance with another embodiment of the present technology.
Figure 10B:
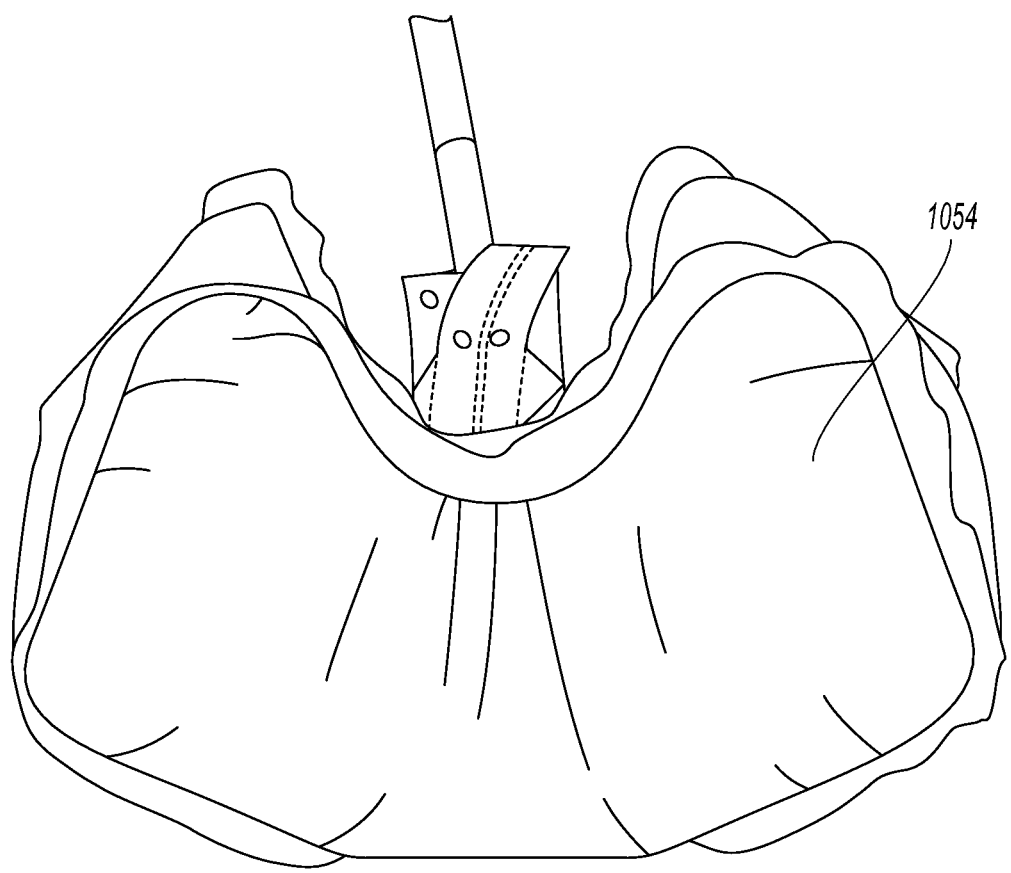
Figure 10C:
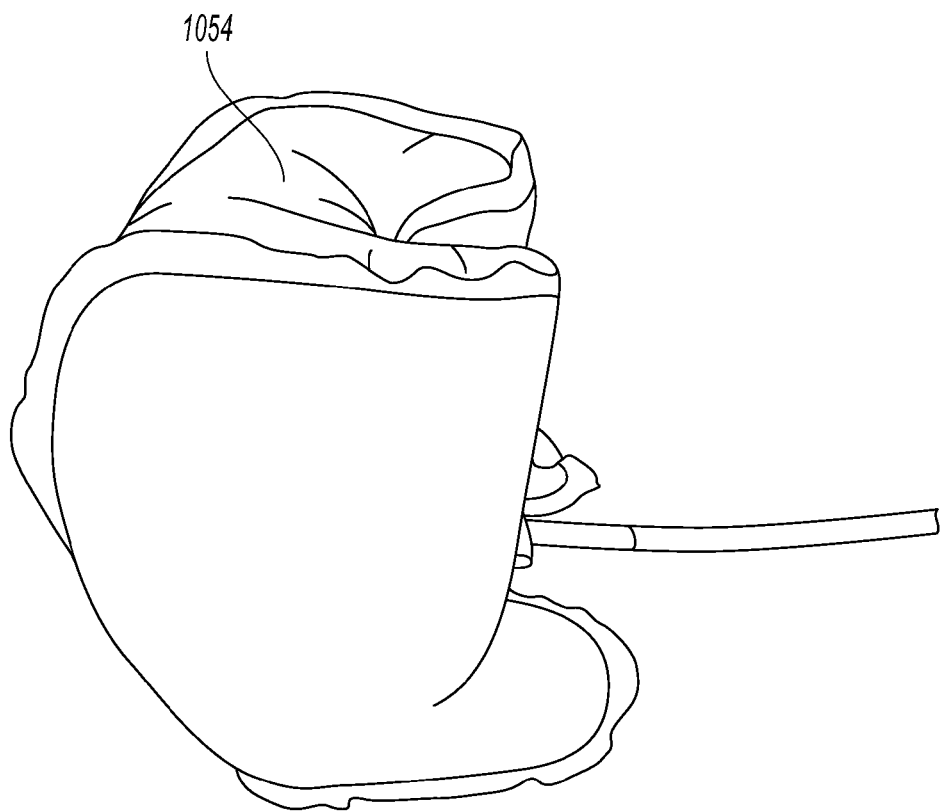

In further embodiments, the airbag 254 can have other suitable cross-sectional shapes or configurations (e.g., a C-shaped cross-sectional shape; FIGS. 10A-10C) to accommodate various locations of the airbag system 100 and/or seats or other interior aircraft structures. In other embodiments, the airbag 254 can have other suitable complex shapes that conform to the shape of monuments positioned forward of an aircraft side-facing seat. It will be appreciated that the airbag 254 is sized and shaped to accommodate a full range of occupant sizes (e.g., heights).

Figure 8:
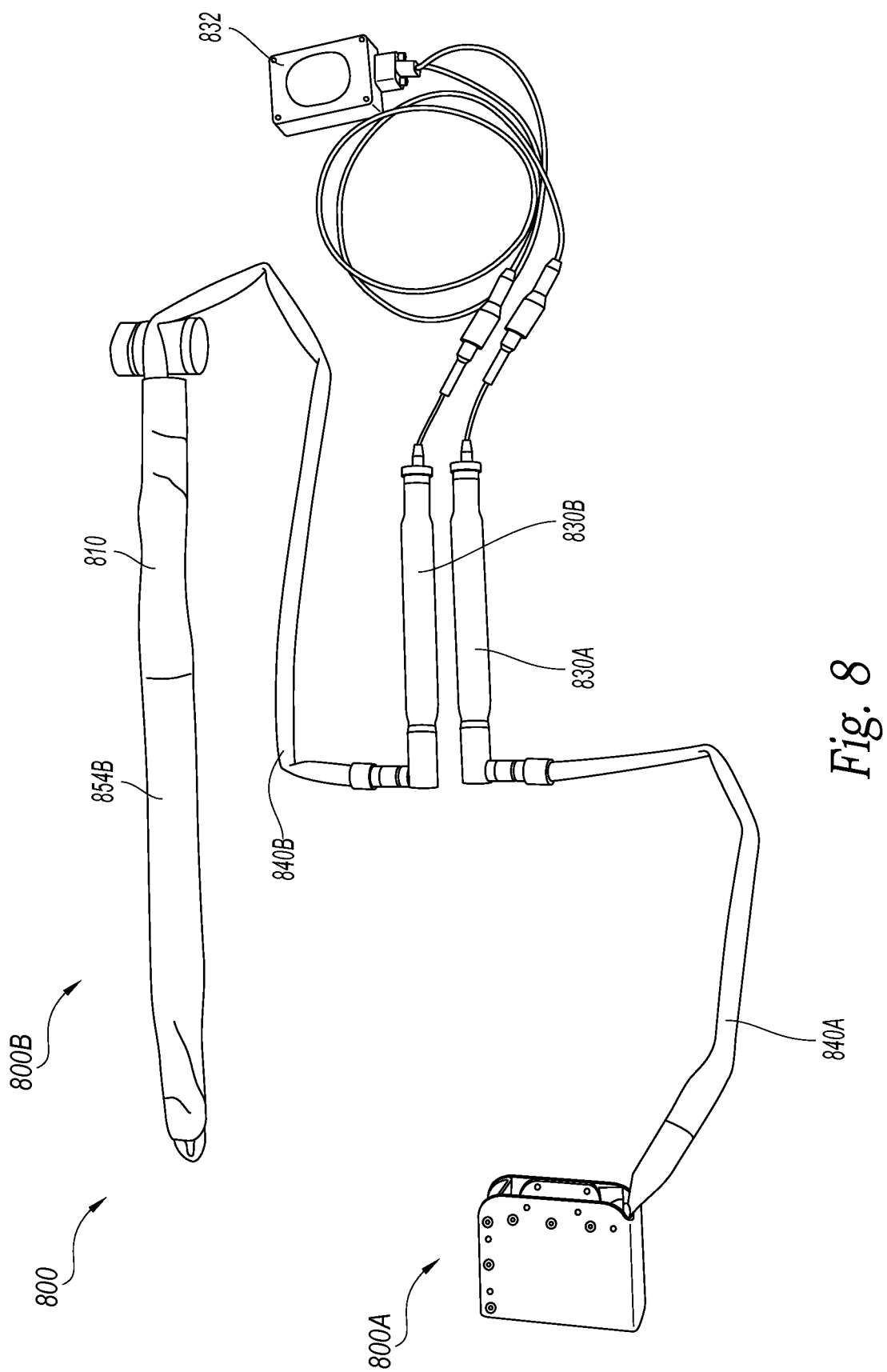
FIG. 8 is an assembly view of a passenger restraint system including a structure mounted airbag system and a seat belt airbag system configured in accordance with an embodiment of the present technology.

FIG. 8 is an assembly view of a passenger restraint system 800 that includes a structure mounted airbag system 800A and a seat belt airbag system 800B configured in accordance with an embodiment of the present technology. As illustrated, the airbag system 800A can include one or more generally similar features as described with respect to the airbag system 100. For example, the airbag system 800A can include a housing 820 for storing an airbag (airbag not shown in FIG. 8). The airbag can be operably coupled to an air hose 840A, inflator 830A, and electronics module assembly 832. The inflator 830A includes a first end portion connected to the air hose 840A and a second end portion connected to the electronics module assembly 832 via one or more cables 863A (e.g., a line-replaceable unit, interface, etc.). During a crash or other significant dynamic event, the electronics module assembly 832 can send a signal to a deployment circuit to initiate the inflator 830A as described above with respect to airbag system 100. The inflator 830A can release gas into the air hose 840A to inflate and deploy the airbag (e.g., a leg airbag) to prevent or reduce leg flail of an occupant.

The seat belt airbag system 800B can include an airbag 854B configured to deploy from a seat belt 810 (e.g., a shoulder belt portion, lap belt portion, etc.). Example seat belt airbag systems and features are disclosed in at least the references incorporated herein. The airbag 854B can be operably coupled to an air hose 840B, inflator 830B, and the electronics assembly 832. The inflator 830B includes a first end portion connected to the air hose 840B and a second end portion connected to the electronics module assembly 832 via one or more cables 863B (e.g., a line-replaceable unit, interface, etc.). During the crash or other rapid deceleration event, the electronics module assembly 832 can send a signal to initiate the inflator 830B in addition to sending the signal to initiate the inflator 830A. The inflator 830B can release gas into the air hose 840B to inflate and deploy the airbag 854B to reduce body flail of an occupant.

FIGS. 9A-9E are a series of front isometric views illustrating various stages of deployment of a structure mounted airbag 954 (FIGS. 9B-9E) and a seat belt airbag 854B (FIGS. 9B-9E) at a side-facing seat 902 in accordance with an embodiment of the present technology. Both the airbag 954 and the seat belt airbag 854B can have generally similar features as any of the airbag and airbag systems described herein, including, for example, airbag 254, airbag systems 100, 500, 800A and seat belt airbag system 800B. Referring to FIGS. 9A-9E together, an occupant 901 is seated in a side-facing seat 902 aligned (e.g., parallel) with a longitudinal axis 903 of the aircraft. Each seat 902 can include a back portion 904 extending upwardly from a seat portion 906 (e.g., a cushion) fixedly mounted to the floor of the aircraft. The airbag 954 (not shown in FIG. 9A) is stowed in the housing 820 that is positioned forward of a seated occupant 901 (e.g., a leading leg 935 of the occupant 901). The housing 820 is positioned under or in a lower portion of the seat portion 906.

In operation, upon detection (e.g., by a crash sensor) of a crash or other rapid deceleration event, the airbag 954 inflates and deploys (e.g., unfolds) through an opening 926 in the housing 820 in a direction generally outward and forward of the leading leg 935 of the seat occupant 901. As described above with respect to FIG. 8, one or more airbags 854B can also deploy from a seat belt 810 (e.g., a shoulder belt portion 911A, lap belt portion 911B. etc.). The airbag 954 can move the door 934 away from the opening 926 as it inflates and deploys from the housing 820. As described above, the housing 820 can be omitted and the airbag 954 can deploy from and be secured to a seat portion or other interior structure. One or more lanyards 931, hinges, and/or other suitable fasteners can secure or retain a portion of the door 934 to the housing 820 (and/or the seat 902 or other interior structure) to prevent the door 934 from ejecting into the aircraft cabin during and/or after deployment. After the airbag 954 is pushed out of the housing 820, it rapidly begins to pressurize and inflate. As described above with respect to FIGS. 2A-2C, a first side portion of the airbag 954 closed to the occupant's legs is inflated and unrolls toward the occupant's legs before a second side portion opposite the first side and the top portion of the airbag 954 unrolls. The airbag 954 is configured to interact with (e.g., react or stop against) a front portion of the seat 902 (e.g., the seat base) forward of the leading leg 935 of the occupant, an armrest, and/or other suitable substantially fixed monument or structure 937 (e.g., a wall or divider) positioned forward of the housing 820. The airbag 954 moves with the occupant's legs 935 until the legs 935 are restrained against further movement (e.g., rotation) when the airbag 954 is pushed up against the front portion of the seat 902 or other monument. The airbag 954 is expected to prevent the occupant's legs 935 from rotating greater than about 35 degrees.

Figure 9A:
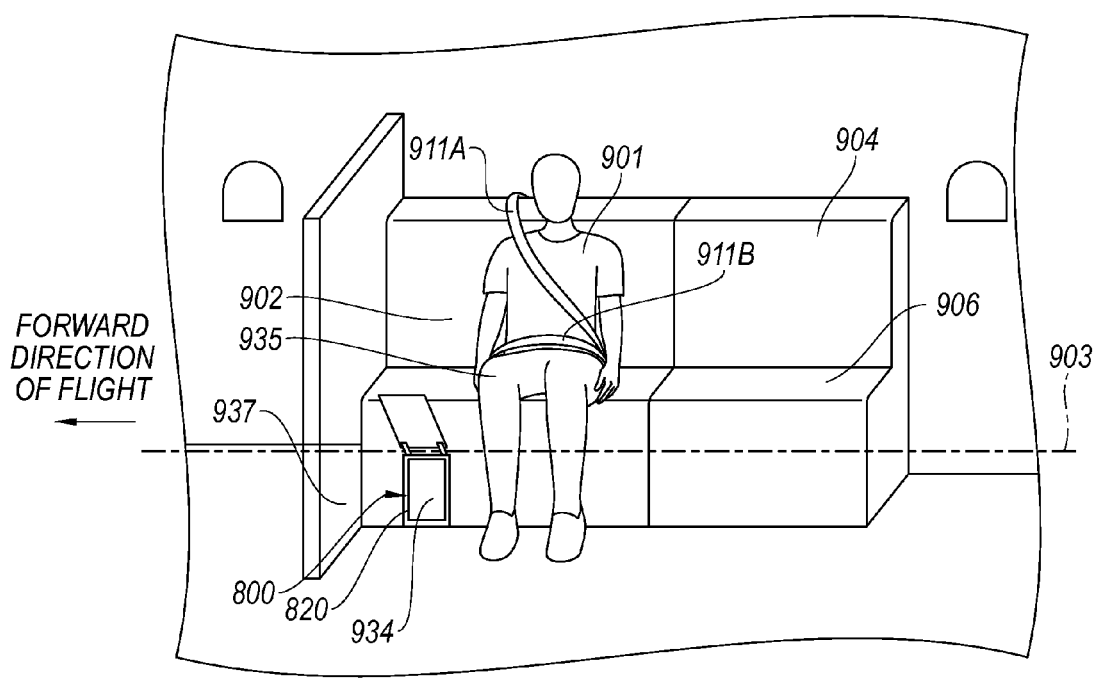
FIGS. 9A-9E are a series of front isometric views illustrating various stages of deployment of a structure mounted airbag and a seat belt airbag at a side-facing seat in accordance with an embodiment of the present technology.
Figure 9B:
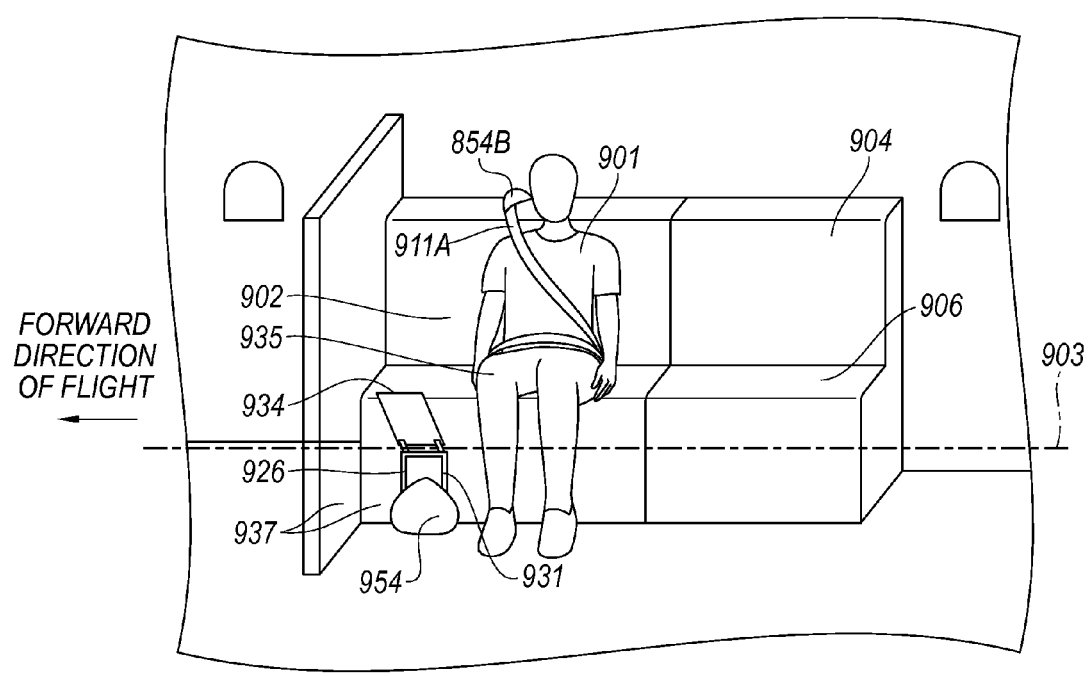
Figure 9C:
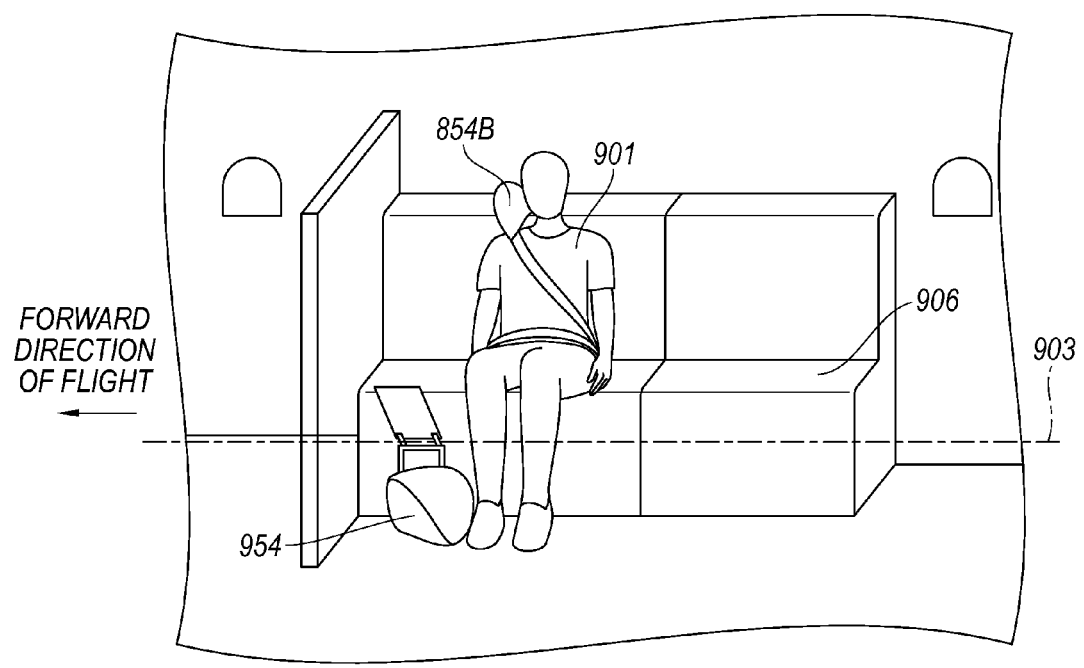
Figure 9D:
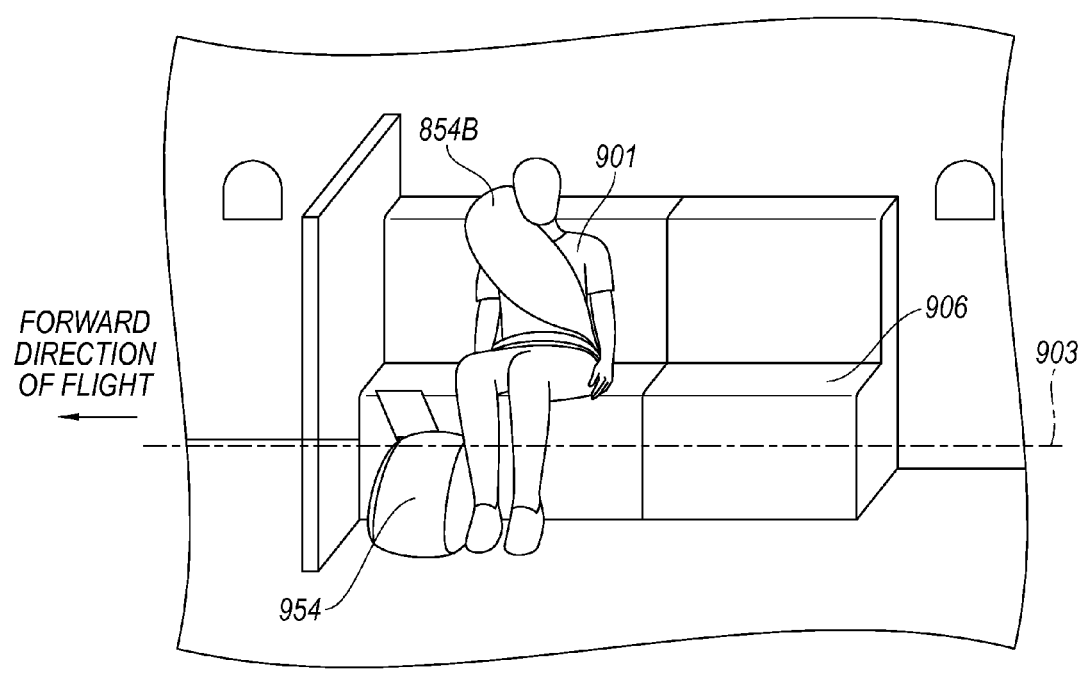
Figure 9E:
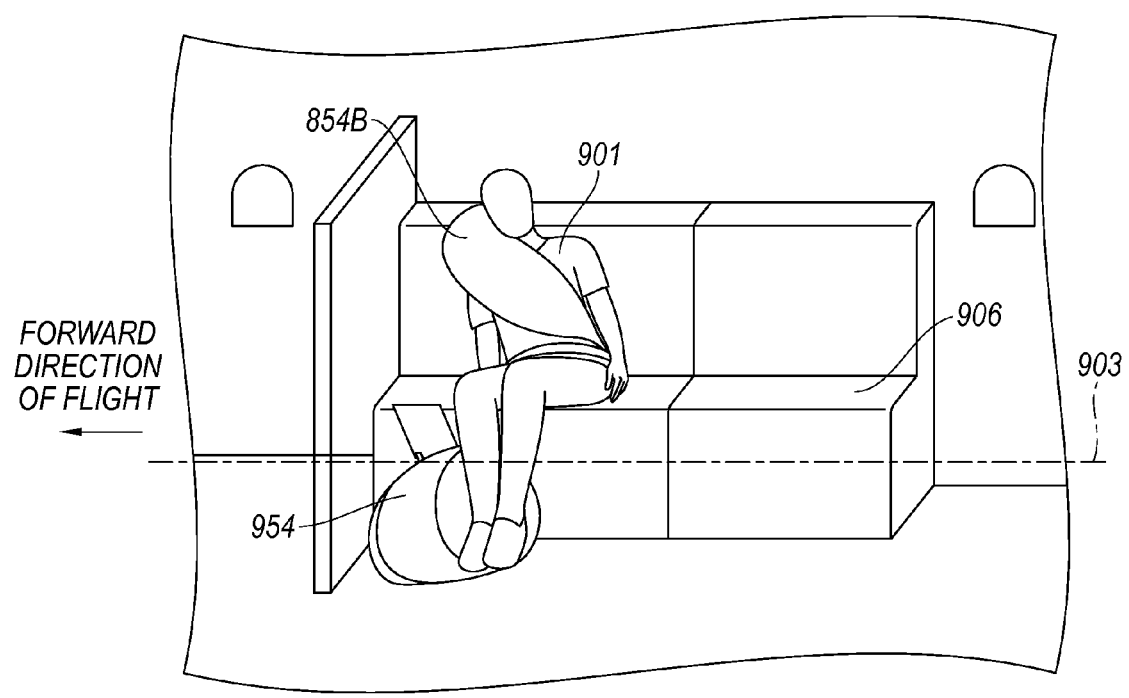

FIG. 9E illustrates the airbag 954 after the seat occupant 901 impacts the airbag 954. The load experienced by the occupant's lower body (e.g., legs, femur, etc.) is distributed or transferred across the inflated airbag 954 to the front of the seat 902 and/or other substantially fixed structure 937 to mitigate or reduce potential injury. In various embodiments, the impact of the seat occupant 901 (e.g., the occupant's legs) against the airbag 954 can activate one or more vents as described above to rapidly decrease the pressure within the airbag 954 and further reduce the impact experienced by the seat occupant 901 (e.g., reduce occupant rebound). The vents (passive and/or active) and other passive and/or active retraction features (e.g., tethers, a post-tensioner retraction unit, active vent, etc.) can quickly deflate the airbag 954 (e.g., within 10 seconds after impact) and/or pull the airbag 954 back toward the housing 820 to provide a substantially clear passageway for the seat occupant 901 to move away from the seat 902 (e.g., facilitate occupant egress from the seat 902) after the crash or other significant dynamic event.

FIGS. 10A-10C are rear isometric, top isometric, and side isometric views, respectively, of a deployed airbag 1054 configured in accordance with another embodiment of the present technology. In contrast with the generally wedge-shaped profile of the airbag 254 described above, the airbag 1054 has a generally C-shaped profile or cross-sectional shape. The airbag 1054 can include one or more of any of the features described above with respect to the airbags 254, 954, etc. For example, the airbag 1054 can include a gas hose, fabric tube, one or more tethers and vents, and/or deploy from a housing. The airbag 1054 is configured for locations (e.g., at or near an end or edge portion of a side-facing seat) where there are little to no reaction surfaces forward of the occupant for the airbag 1054 to deploy or react against to reduce leg flail of an occupant.

Figure 11A:
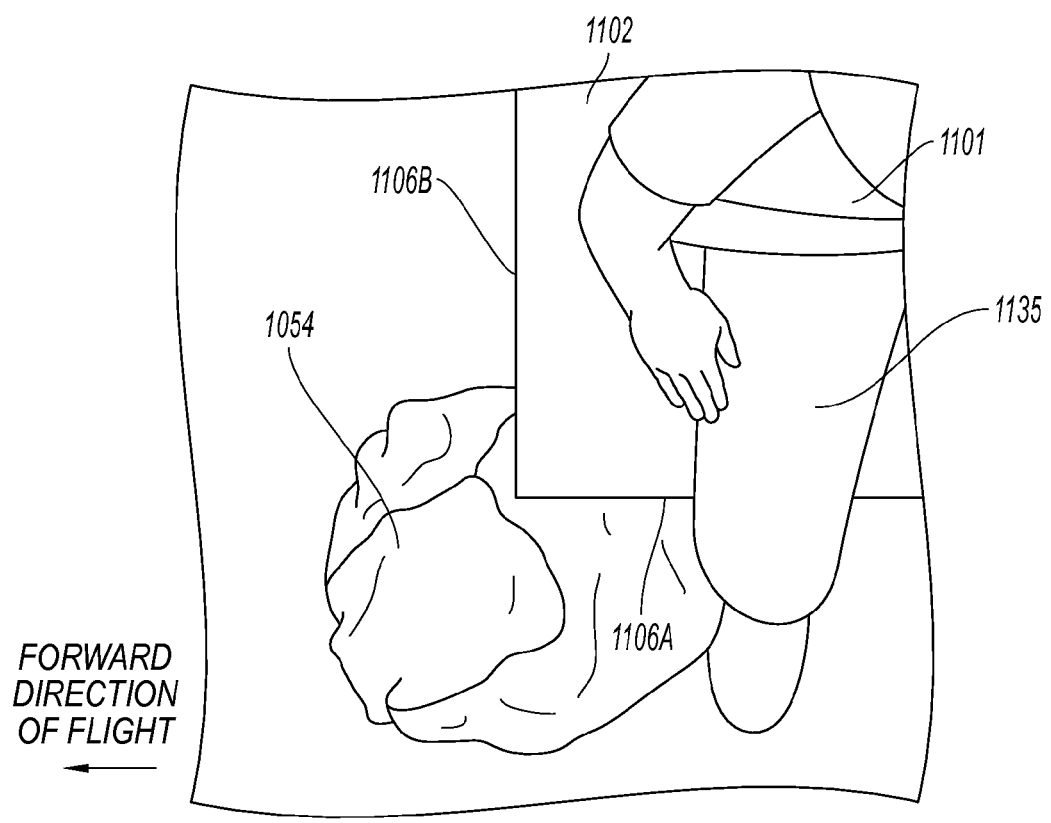
FIGS. 11A-11D are a series of top views illustrating various stages of deployment of the airbag of FIGS. 10A-100.
Figure 11B:
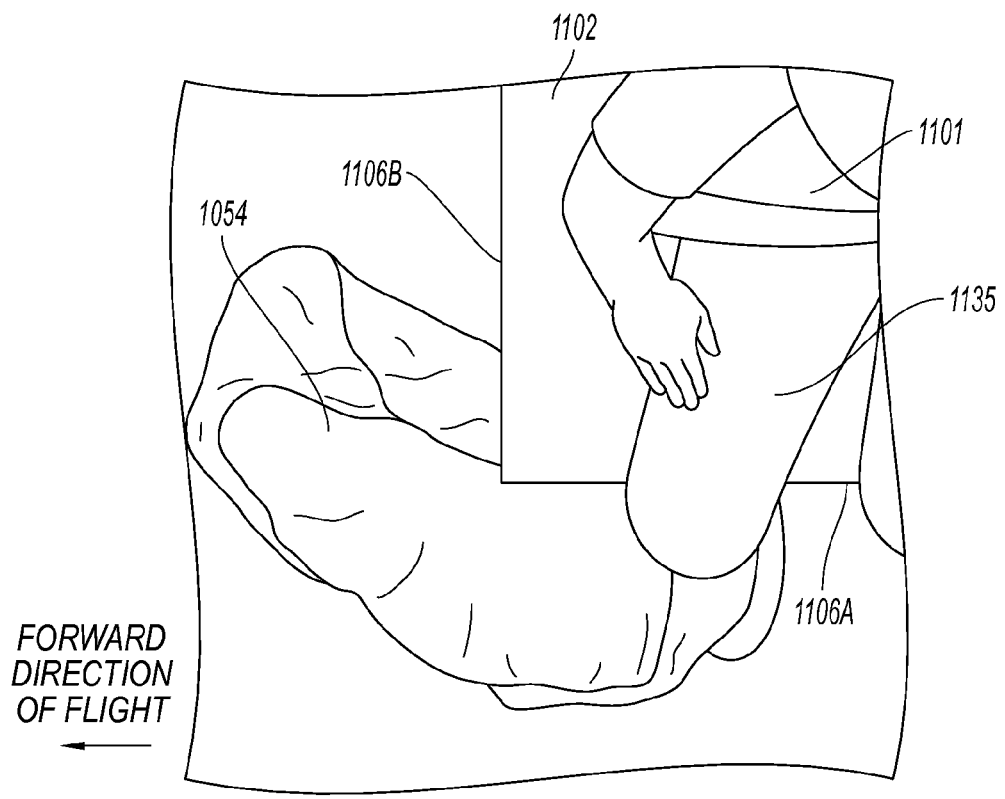
Figure 11C:
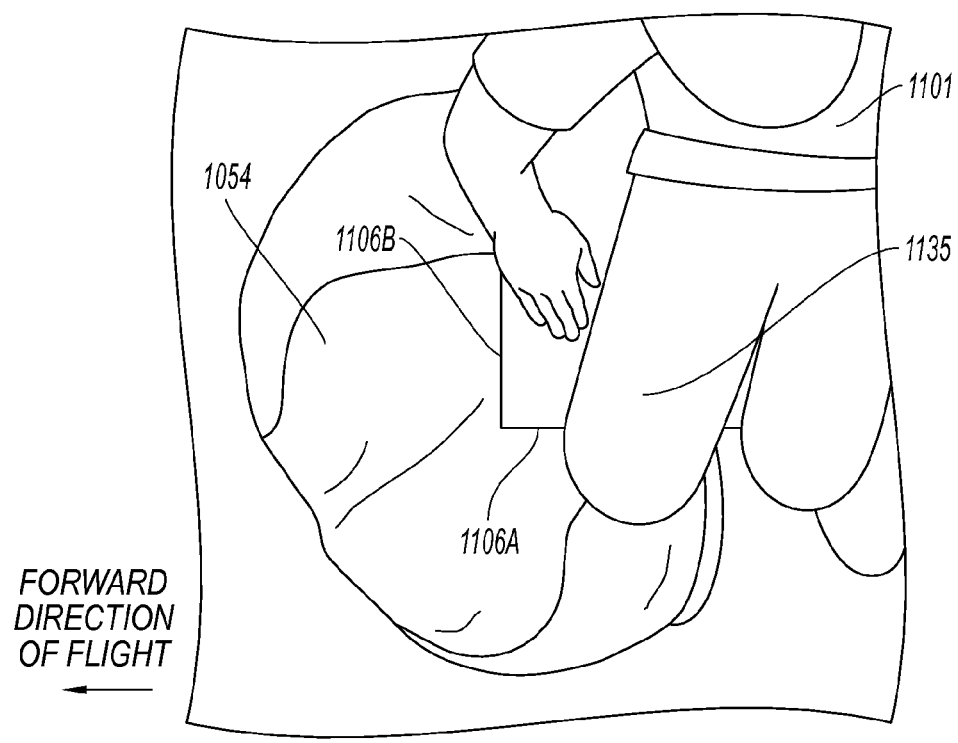
Figure 11D:
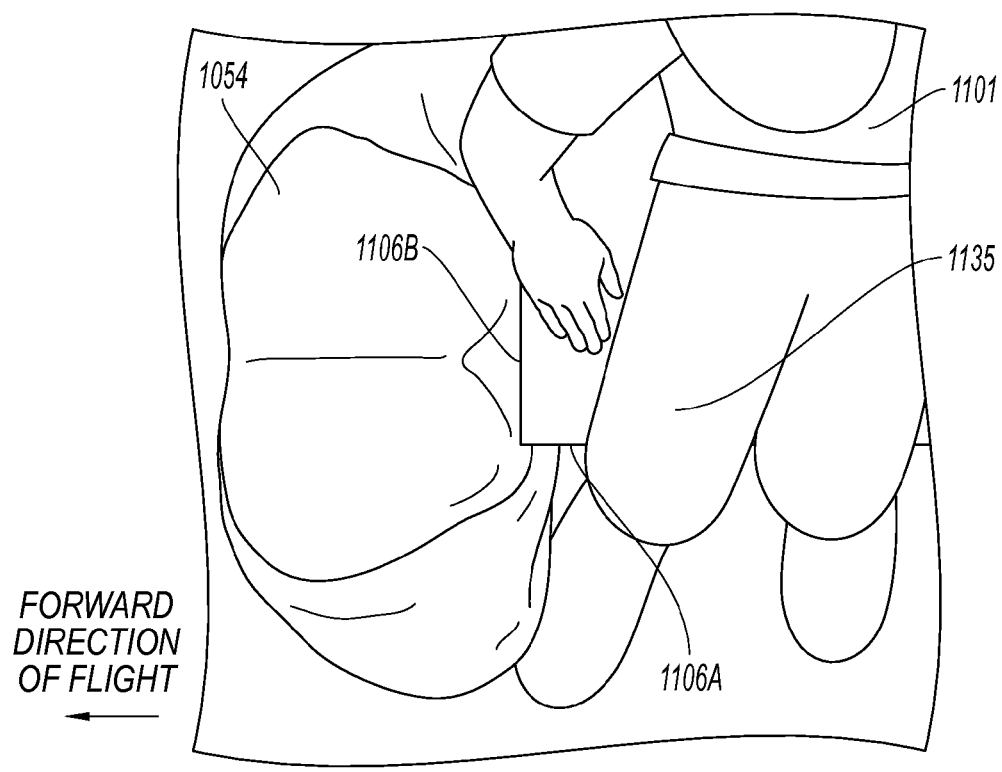

FIGS. 11A-11D are a series of top views illustrating various stages of deployment of the airbag 1054 of FIGS. 10A-10C. Referring to FIGS. 11A-11D together, the airbag 1054 is configured to deploy forward of a leading leg 1135 of a seat occupant 1101 (e.g., from or out of a front seat portion 1106A of a side-facing seat 1102). The airbag 1054 is positioned at or near an end/edge portion of the side-facing seat 1102. There is no wall or other structure positioned adjacent the seat 1102. The airbag 1054 is provided with a C-shaped cross-section such that as it inflates and deploys, it can move (e.g., rotate, wrap, bend) around front seat portion 1106A of the seat 1102 so that it can use a side seat portion 1106B of the seat 1102 to react or stop against. The airbag 1054 moves with the occupant's legs 1135 until the legs 1135 are restrained against further movement (e.g., rotation) when the airbag 1054 reacts or stops against the side seat portion 1106B. The airbag 1054 is expected to prevent the occupant's legs 1135 from rotating greater than about 35 degrees. Referring to FIG. 11B, a front portion of the airbag 1154 is initially oriented generally in a direction facing an opposite side of the aircraft cabin as the side the seat 1102 is positioned on. Referring to FIG. 11D, when fully deployed and rotated, the front portion of the airbag 1154 is oriented generally toward a forward direction of flight (e.g., in a direction generally perpendicular to that of FIG. 11B when the airbag 1154 initially deploys).

Figure 12A:
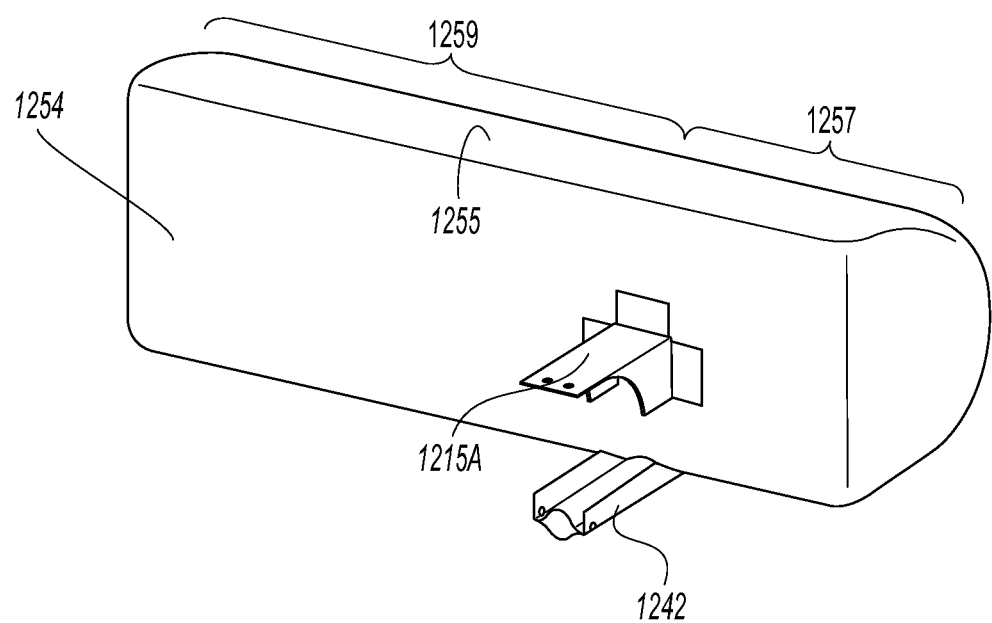
FIG. 12A is a rear isometric view.
Figure 12B:
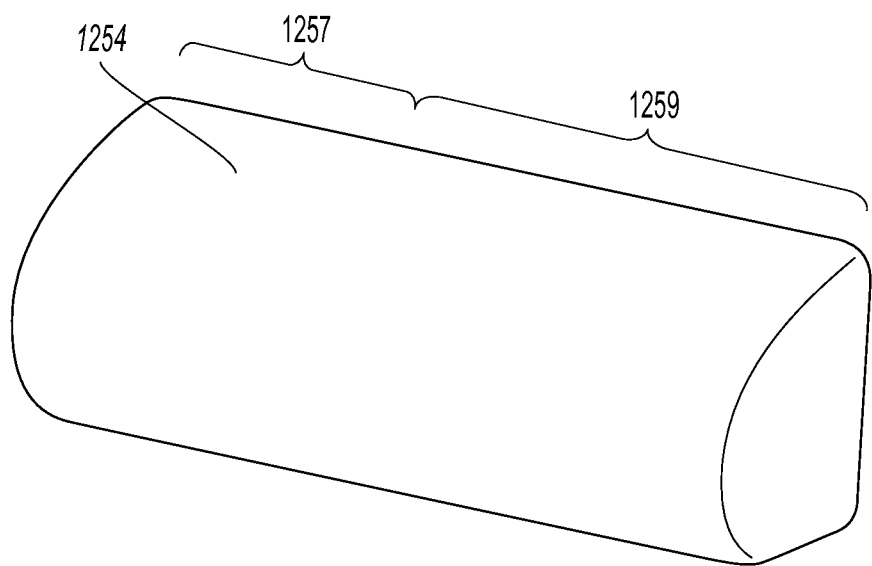
FIG. 12B is a front isometric view of a deployed airbag configured in accordance with yet another embodiment of the present technology.

FIG. 12A is a rear isometric view and FIG. 12B is a front isometric view of a deployed airbag 1254 configured in accordance with yet another embodiment of the present technology. In this embodiment, the airbag 1254 has a generally wedge-shaped profile or cross-sectional shape similar to that of airbag 254. The airbag 1054 can include one or more of the features described above with respect to the airbags 254, 954, etc. For example, the airbag 1254 can include a gas hose, fabric tube, one or more tethers, and/or vents. The airbag 1254 includes a top portion 1255, first side portion 1257, and an elongated second side portion 1259. In contrast to the airbag 254, the first side portion 1257 of the airbag 1254 is proportionally shorter in length than the second side portion 1259 closest to the occupant. Accordingly, as illustrated in FIG. 12B, the fabric tube 1242 and tether 1215A are not attached to a substantially middle portion of the airbag 1254. Therefore, a length of the second side portion 1259 in a longitudinal direction away from the fabric tube 1242 and tether 1215A is longer than the length of the first side portion 1257 extending in a direction opposite to the longitudinal direction of the second side portion 1259. Similar to airbag 254, the airbag 1254 can include rear and bottom portions that extend substantially parallel to a front portion of an aircraft seat and aircraft cabin floor when the airbag 1254 is deployed.

Figure 13A:
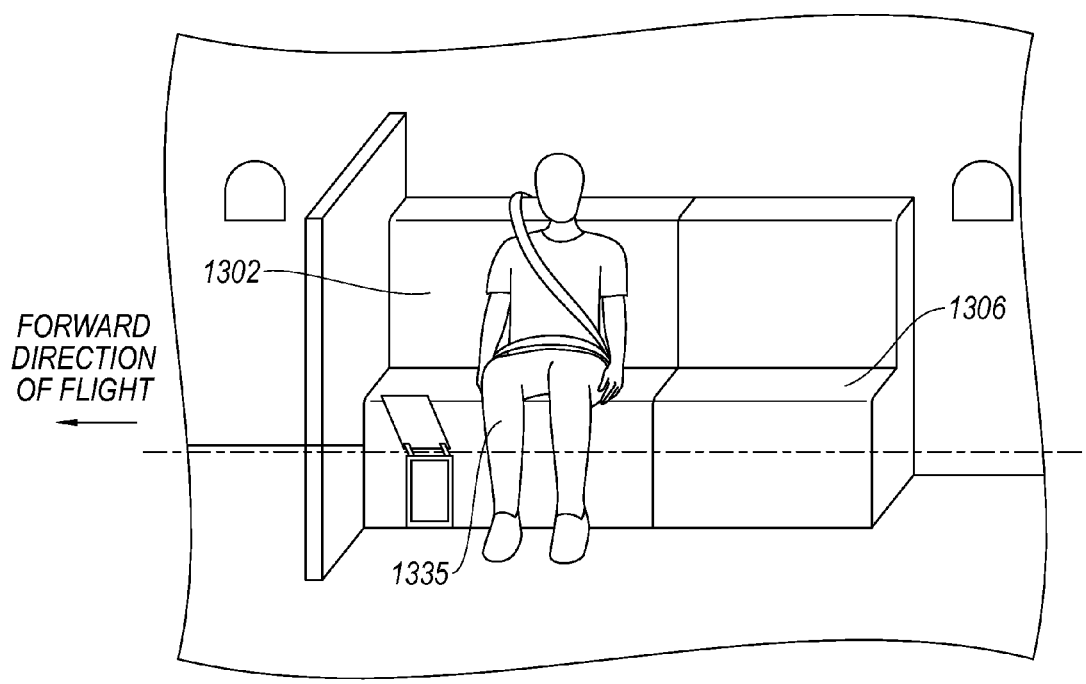
FIGS. 13A-13E are a series of front isometric views illustrating various stages of deployment of the airbag of FIGS. 12A and 12B.
Figure 13B:
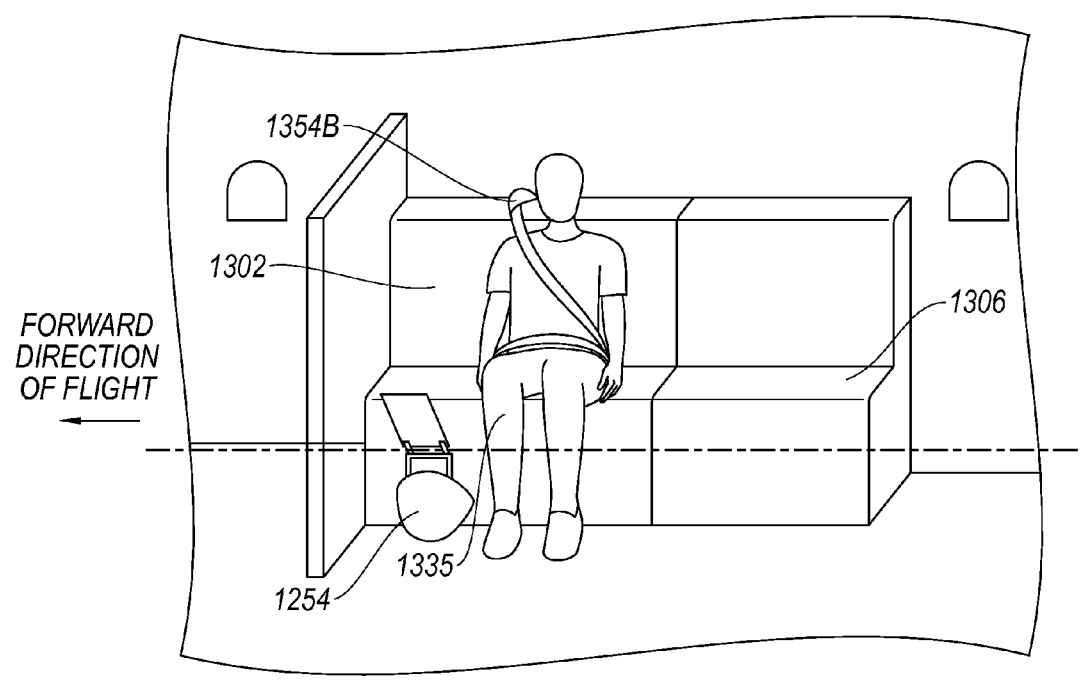
Figure 13C:
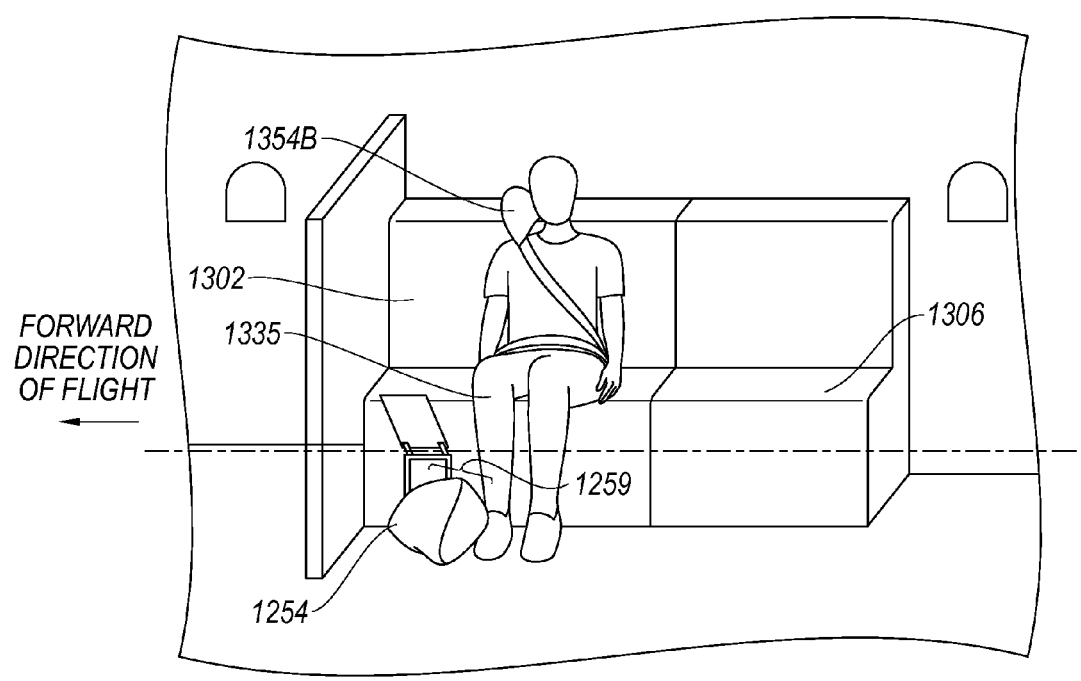
Figure 13D:
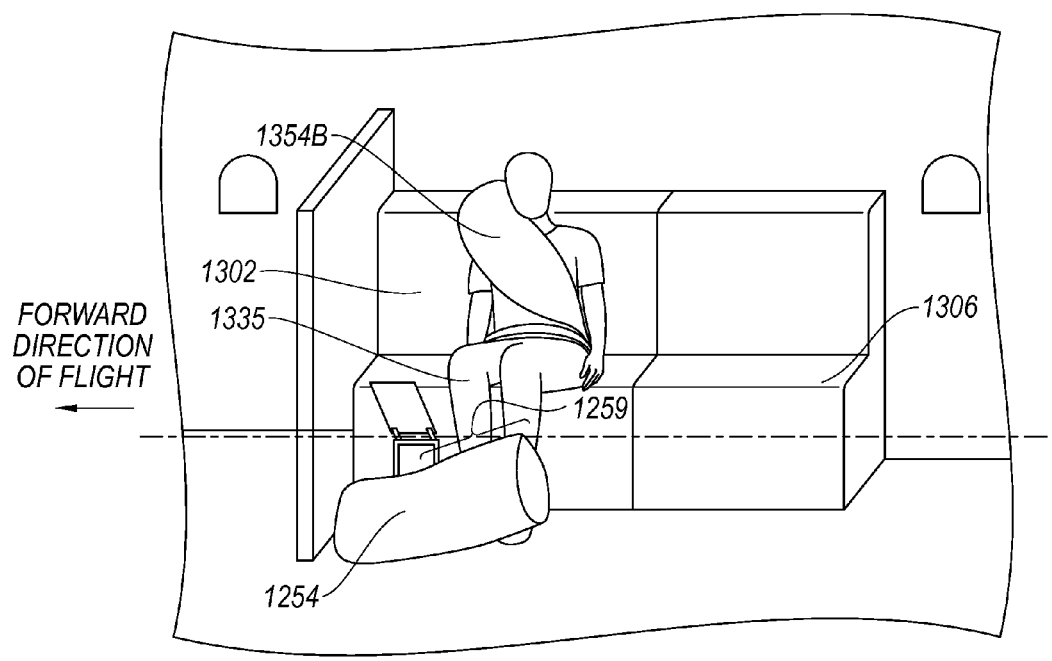
Figure 13E:
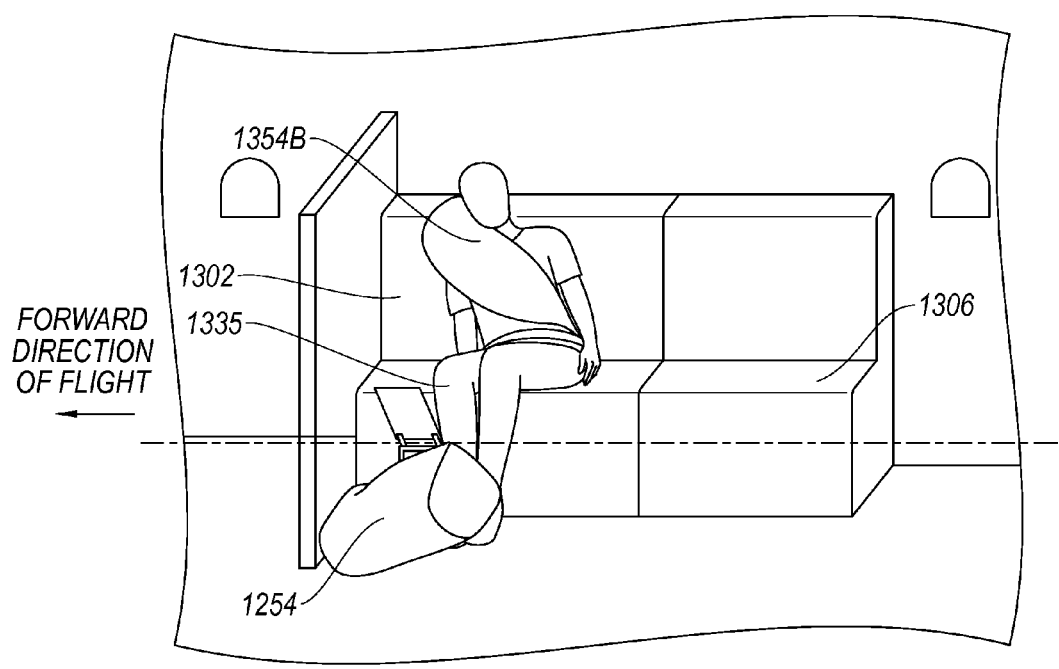

FIGS. 13A-13E are a series of front isometric views illustrating various stages of deployment of the airbag 1254 (FIGS. 13B-13E) and a seat belt airbag 1354B (FIGS. 13B-13E) at a side-facing seat 1302 in accordance with an embodiment of the present technology. Referring to FIGS. 13A-13E together, the airbag 1254 deploys forward of a leading leg 1335 of a seat occupant 1301 (e.g., from or out of a front seat portion 1306 of a side-facing seat 1302). The airbag 1254 is pushed out of a housing and inflates such that the second side portion 1259 unfurls or unrolls toward the occupant's legs before the first side portion 1257 and top portion 1259 unfurl or unroll. As best seen in FIG. 13D, the second side portion 1259 of the airbag 1254 deploys over and in front of the occupant's legs (e.g., lower legs), rather than to the side as described above with reference to airbags 254 and 1054. For example, a rear portion (e.g., face or surface) of the airbag 1254 is positioned on top of or over the occupant's legs 1335. Further, in contrast to airbags 254 and 1054 that use a front or side portion of the seat or other structure to react or stop against to prevent leg flail, the airbag 1254 is configured to move with the occupant's legs 1335 until the tethers 1215A and/or fabric tube 1242 are pulled taught, restraining the airbag 1254 and the legs 1335 against further movement (e.g., rotation). Accordingly, the length and elasticity of the tethers 1215A and/or fabric tube 1242 (not shown in FIGS. 13A-13E) can control the amount the airbag 1254 can move with the legs 1335 before preventing or inhibiting further movement or rotation. Like the previously described airbags, the airbag 1254 is expected to prevent the occupant's legs 1335 from rotating greater than about 35 degrees. In some embodiments, the airbag 1254 may be smaller in volume and/or be stored in a smaller housing than airbags 254 or 1054 as the airbags 254 and 1054 are sized to be large enough to reduce the likelihood of an occupant's legs rotating past or over the front of the airbag as they deploy to the side of the occupant's legs. The airbag 1254 can be attached to longer tethers or fabric tubes as opposed to requiring a larger airbag to allow the airbag 1254 to extend over and in front of the occupant's legs 1335.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. An airbag system for use with a side-facing seat in a vehicle, wherein the side-facing seat faces generally perpendicular to a longitudinal axis of the vehicle, and wherein the airbag system comprises:
   a housing having a cavity and an opening in communication with the cavity, wherein the housing is positioned forward of a leading leg of an occupant when the occupant is seated in the side-facing seat;
   an airbag assembly stowed within the cavity, the airbag assembly having an airbag configured to deploy through the opening to inhibit occupant leg rotation in response to a significant dynamic event;
   an inflator;
   a gas delivery hose operably coupling the inflator to the airbag and configured to direct gas from the inflator to the airbag; and
   a tether including a first end portion attached to the housing and a second end portion attached to the airbag, wherein the first end portion is not directly connected to the inflator, and wherein the tether includes a fabric tube portion that defines a passage enclosing at least a portion of the gas delivery hose.

2. The airbag system of claim 1 wherein the housing is positioned at least proximate a side-facing seat in an aircraft.

3. The airbag system of claim 1 wherein the housing includes an aperture configured to receive a tool to be inserted therethrough to induce at least one bend in the gas delivery hose positioned therein.

4. The airbag system of claim 1 wherein the gas delivery hose includes at least one bend positioned within the cavity of the housing prior to airbag deployment, and wherein the gas delivery hose is configured to straighten and push the airbag out of the housing upon deployment.

5. The airbag system of claim 1 wherein a portion of the tether extends into the airbag and includes two layers of fabric, and wherein the airbag system further includes a stiffener secured between the two layers of fabric.

6. The airbag system of claim 1 wherein the first end portion of the tether is attached to the housing with one or more fasteners such that the fasteners are positioned outside the cavity.

7. The airbag system of claim 1 wherein the airbag, when inflated, has a generally wedge-shaped cross-sectional shape.

8. The airbag system of claim 7 wherein the airbag includes a first side extending laterally from the attachment of the gas delivery hose and a second side extending laterally in a direction opposite the first side, the second side having a length greater than the first side.

9. The airbag system of claim 1 wherein the airbag, when inflated, has a generally C-shaped cross-sectional shape.

10. The airbag system of claim 1 wherein the tether is a first tether, and wherein the system further comprise a second tether having a first end portion coupled to the airbag and a second end portion coupled to the housing, wherein the second tether is positioned to retain the airbag to the housing after the airbag is deployed.

11. The airbag system of claim 10 wherein the second tether is an upper tether and the first tether is a lower tether configured to retain the airbag to the housing after the airbag is deployed, and wherein the first tether and the second tether are secured to the housing behind a rear plate of the housing.

12. The airbag system of claim 1, further comprising an electronics module assembly having a sensor, wherein the electronics module is operably coupled to the inflator and configured to initiate airbag deployment when a significant dynamic event is detected by the sensor, and further wherein a post-tensioner retraction unit operably coupled to the electronics module assembly is initiated to retract the airbag after the airbag is deployed.

13. The airbag system of claim 1 wherein the airbag is stowed in the cavity with folded opposing first and second side portions prior to inflation such that one of the first and second side portions nearest the occupant's legs unfurls towards the occupant before the other first and second side portions unfurls in an opposite direction away from the occupant when the airbag is inflated.

14. An airbag system for use in a vehicle, the airbag system comprising:
   an opening in an interior structure of the vehicle at least proximate a side-facing seat of the vehicle, wherein the opening is positioned between a forward portion of the vehicle and a leading leg of an occupant when the occupant is seated in the side-facing seat;

an airbag assembly stowed within the opening, wherein the airbag assembly includes an airbag configured to deploy from the opening in response to a significant dynamic event; and an inflator operably coupled to the airbag via a gas delivery hose and configured to provide fluid for inflating the airbag via the gas delivery hose, wherein the airbag is secured to the interior structure of the vehicle during both stowage and deployment via upper and lower tethers, and wherein the upper and lower tethers are attached to both the interior structure and the airbag.

15. The airbag system of claim 14 wherein the opening is at least proximate a side-facing seat of an aircraft.

* * * * *